(12) United States Patent
Nagano et al.

(10) Patent No.: US 6,252,645 B1
(45) Date of Patent: *Jun. 26, 2001

(54) IMAGE READING APPARATUS WITH ADJUSTABLE EXPOSURE

(75) Inventors: Masatoshi Nagano, Tokyo; Yoshinari Onda; Hidekage Sato, both of Kawasaki, all of (JP)

(73) Assignee: Canon Kabushiki Kaisha

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,544

(22) Filed: Feb. 19, 1998

(30) Foreign Application Priority Data

Feb. 27, 1997 (JP) ...................................................... 9-043487
May 13, 1997 (JP) ...................................................... 9-122265

(51) Int. Cl.$^7$ ........................... G03B 27/00; G03B 27/72; G03B 27/32
(52) U.S. Cl. ................................. 355/18; 355/69; 355/77
(58) Field of Search ................................. 355/18, 27, 40, 355/67, 69, 71, 77; 358/298, 474, 486, 296, 451, 487, 494, 496, 506, 475; 348/96, 97

(56) References Cited

U.S. PATENT DOCUMENTS

| | | | |
|---|---|---|---|
| 4,990,953 | * | 2/1991 | Ibuchi .................................... 355/69 |
| 5,420,700 | * | 5/1995 | Maeda et al. ......................... 358/496 |
| 5,568,270 | * | 10/1996 | Endo .................................... 358/298 |
| 5,568,273 | * | 10/1996 | Sato et al. ............................. 358/451 |
| 5,793,496 | * | 8/1998 | Morigami ............................. 358/296 |
| 5,875,269 | * | 2/1999 | Yamashita et al. .................. 358/475 |

* cited by examiner

Primary Examiner—Russell Adams
Assistant Examiner—Peter B. Kim
(74) Attorney, Agent, or Firm—Morgan & Finnegan LLP

(57) ABSTRACT

In an image reading apparatus for reading an image recorded on a film, an amount of light being incident on a line sensor comprised in the apparatus and transmitted through the film is adjusted according to the image density of the film such that a relative speed between the film and the line sensor and the luminance of a lamp for irradiating light on the film are controlled.

16 Claims, 29 Drawing Sheets

FIG.11

| FILM DENSITY | $D_1$ | $D_2$ | $D_3$ | $D_4$ |
|---|---|---|---|---|
| MOTOR DRIVE SPEED | $V_1$ | $V_2$ | $V_3$ | $V_4$ |

FIG.12

| FILM DENSITY | $D_1$ | $D_2$ | $D_3$ | $D_4$ |
|---|---|---|---|---|
| MOTOR DRIVE SPEED | $V_1$ | $V_2$ | $V_3$ | $V_4$ |
| LAMP LUMINANCE | $L_1$ | $L_2$ | $L_3$ | $L_4$ |

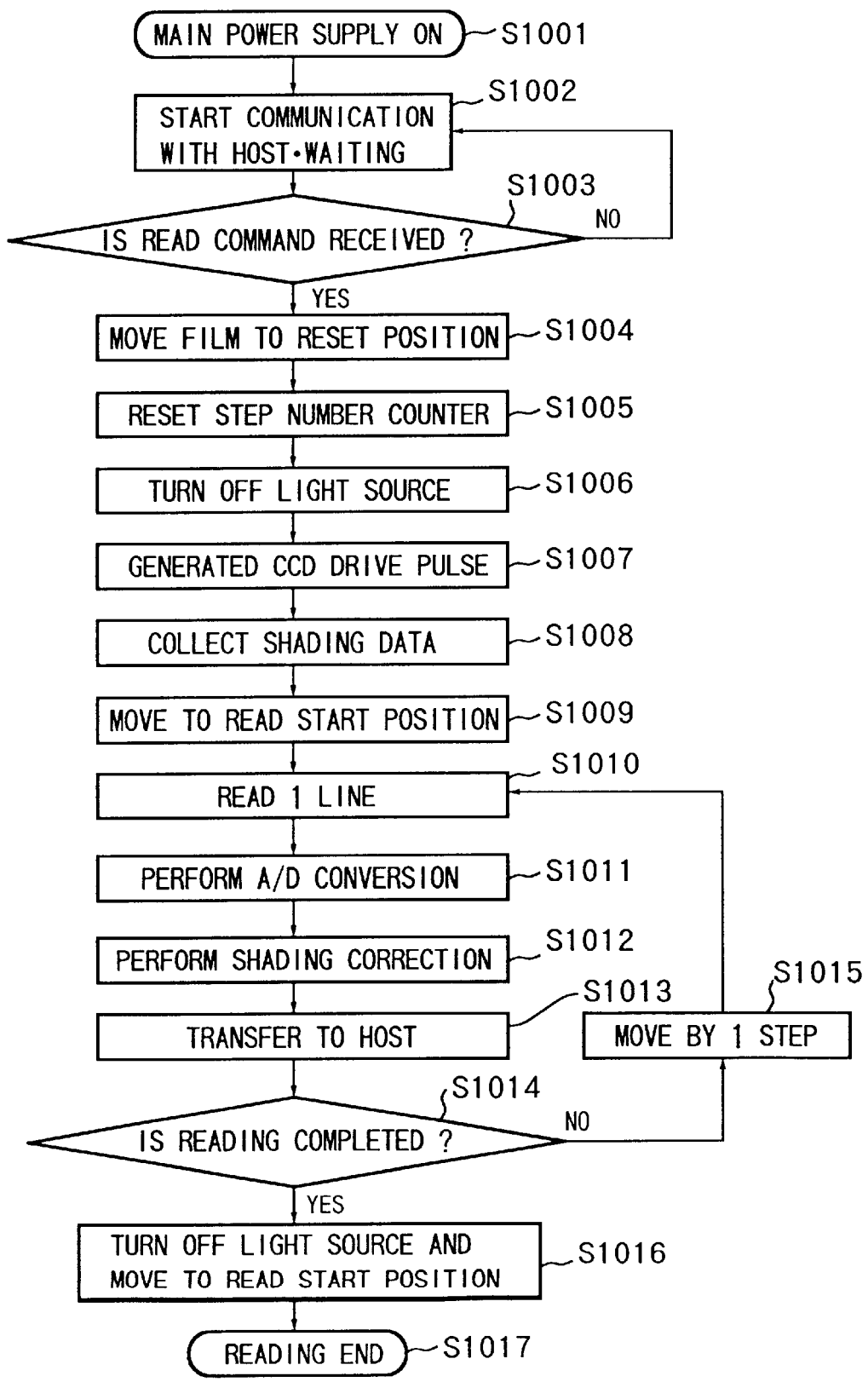

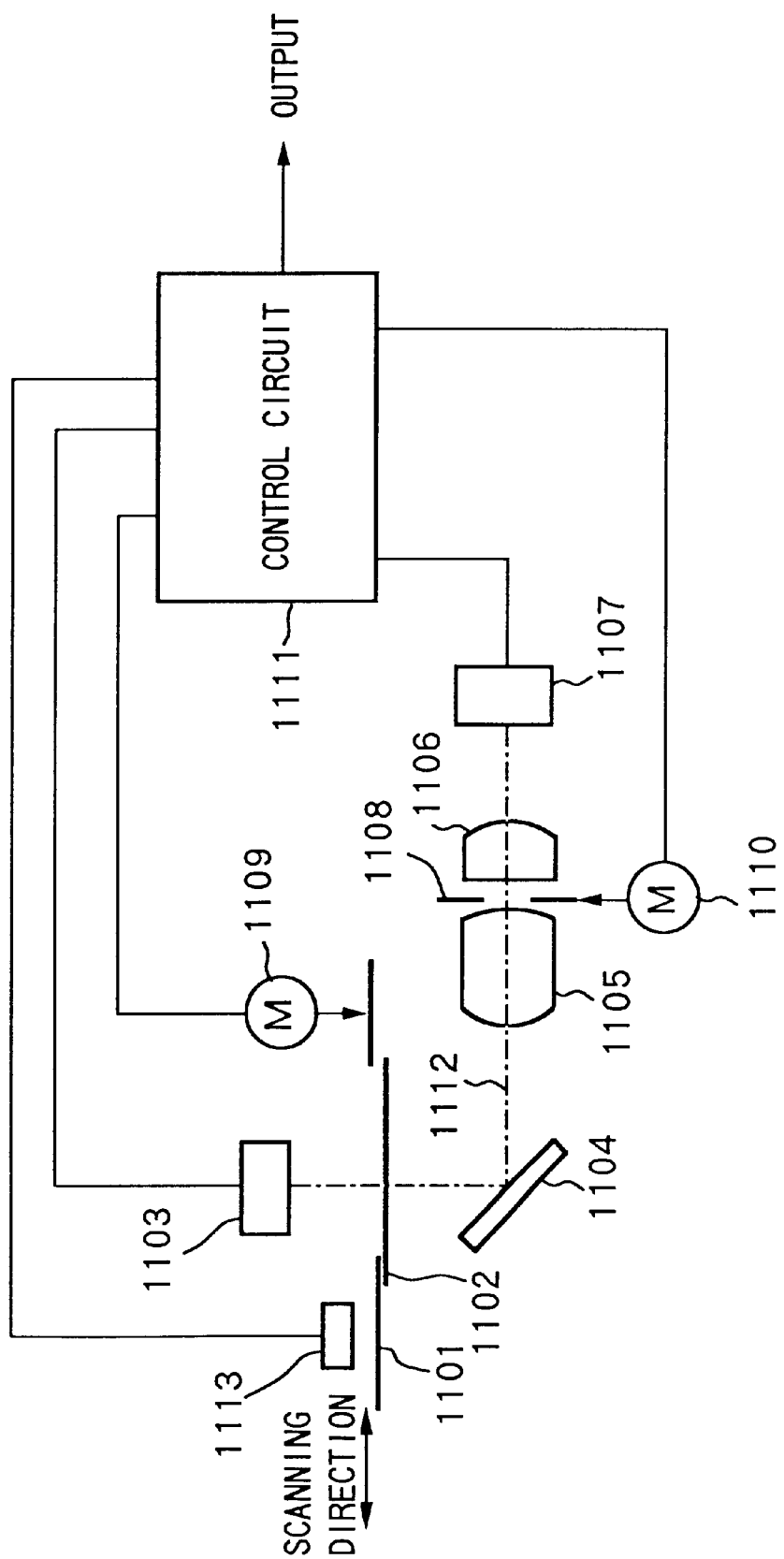

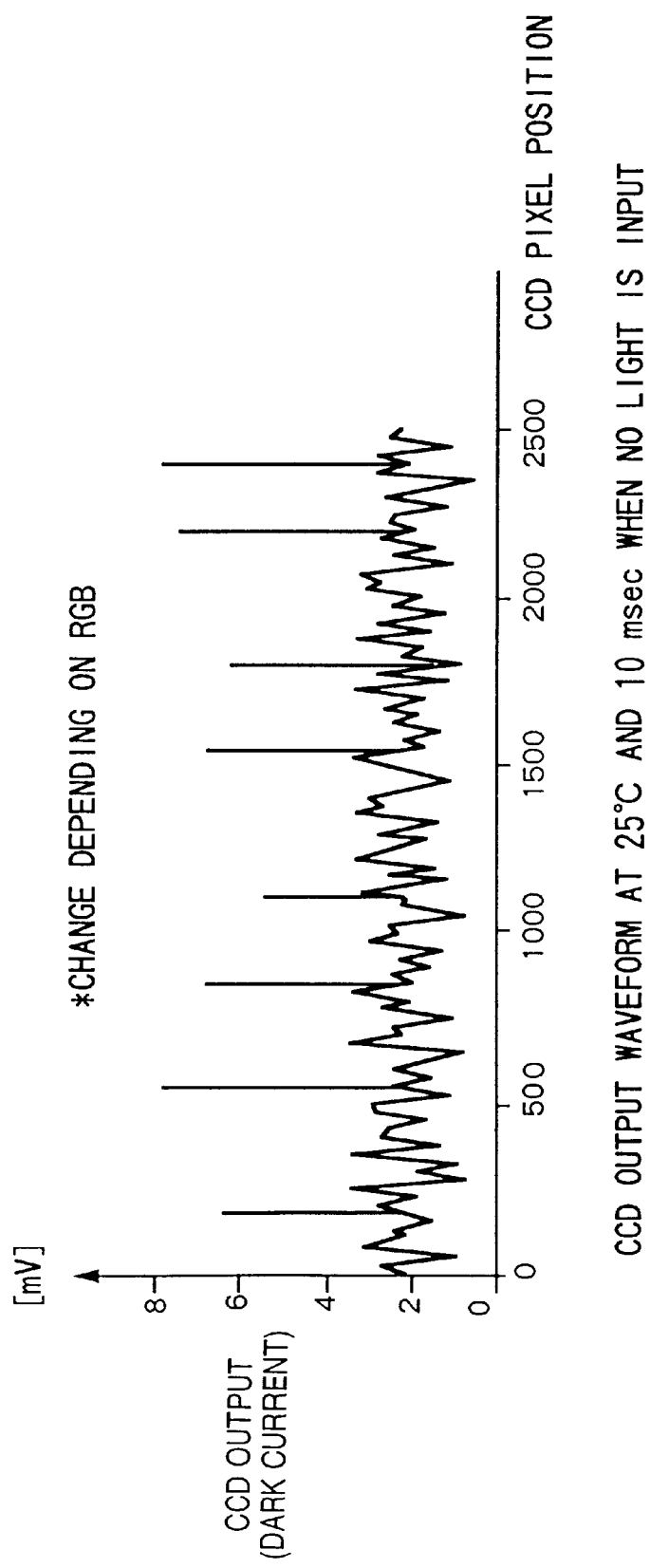

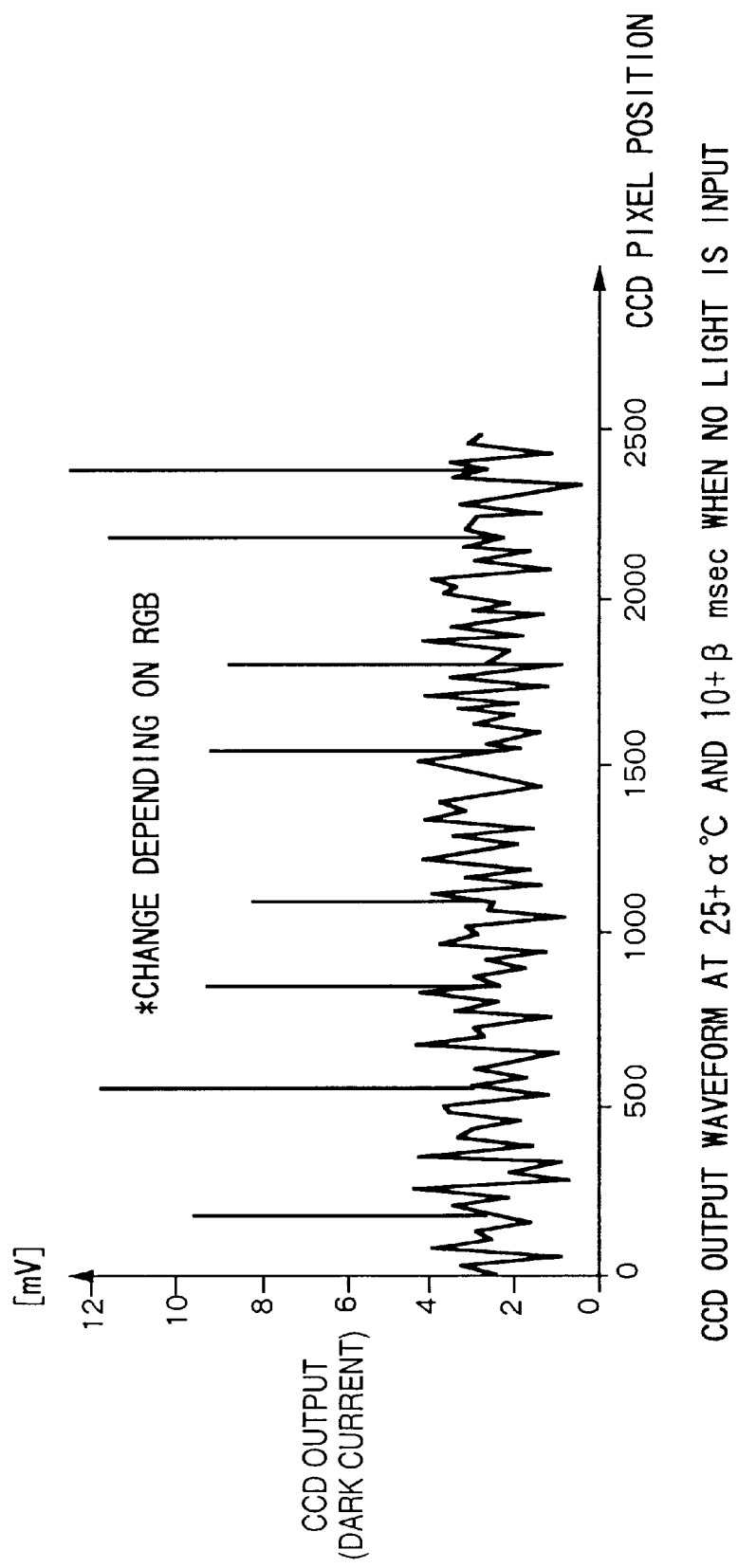

IMAGE READING APPARATUS WITH ADJUSTABLE EXPOSURE

BACKGROUND OF THE INVENTION

1. Field of the Invention

The present invention relates to an image reading apparatus for reading an image recorded on an original such as a film.

2. Description of the Related Art

In recent years, the following technique has developed. That is, an image obtained by reading a film image serving as an original by a film scanner or the like is displayed on a display, and a user edits and processes the image to obtain a preferable image. The frequency of transmission of image data of a film image to a communication destination by using a communication device rapidly increases. As a method of reading a film image, the following methods are generally used. That is, a film original is irradiated by an illumination light source from one side of the film original to directly read a transparent film image from an area sensor, or a film image is read by causing a high-density line sensor to mechanically scan the film image.

Here, as an example of a conventional image reading apparatus, a film scanner for reading the image of a transparent original (film) will be exemplified. A conventional film scanner which reads an image recorded on a film to input the image to a personal computer has been mainly developed for a 35 mm standard film. When an image is to be read by such a film scanner, scanning (pre-scanning) at a low resolution, and an image obtained by this scanning is displayed on a personal computer as a preview screen. Thereafter, the film scanner is instructed to main-scan a desired read range designated on the preview screen. The film scanner main-scans the desired range of the indicated image to transmit image data obtained by this scanning to the personal computer.

FIG. 30 is a schematic view showing the arrangement of a conventional film scanner. Referring to FIG. 30, reference numeral 1101 denotes an original table (film carriage), and reference numeral 1102 denotes a developed film which is fixed to the original table 1101. Reference numeral 1103 denotes a lamp serving as a light source; 1104, a mirror; 1105 and 1106, lenses; 1107, a line sensor constituted by a CCD (Charge Coupled Device); and 1108, an aperture unit whose aperture can be mechanically adjusted.

Reference numeral 1109 denotes a motor for moving the original table 1101 in a scanning direction; 1110, a motor for adjusting the aperture of the aperture unit 1108; 1111, a control circuit; and 1113, a sensor for detecting the position of the original table 1101.

The lamp 1103, the line sensor 1107, the motors 1109 and 1110, and the sensor 1113 are electrically connected to the control circuit 1111, and the control circuit 1111 controls determination and adjustment of an aperture, movement of the original table 1101, ON/OFF of the lamp 1103, and the like. Light irradiated from the lamp 1103 passes through the developed film 1102 along an optical axis 1112, is reflected by the mirror 1104, and then passes through the lenses 1105 and 1106 and the aperture unit 1108 to reach the line sensor 1107.

A method of reading image information from the developed film 1102 by using the film scanner 30 will be described below.

The control circuit 1111 causes the motor 1110 to drive the aperture unit 1108 such that the aperture of the aperture unit 1108 is set in a predetermined standard state, and turns on the lamp 1103. The control circuit 1111 causes the sensor 1113 to detect the position of the original table 1101, rotates the motor 1109 to scan the image of the developed film 1102, and then moves the original table 1101 toward the film surface. The control circuit 1111 causes the line sensor 1107 to read light transmitted through the developed film 1102.

Here, the control circuit 1111 determines the aperture of the aperture unit 1108 not to saturate electric charges in the light-receiving element of the line sensor 1107, and causes the motor 1110 to adjust the aperture of the aperture unit 1108 to the determined aperture. Upon completion of the adjustment, the original table 1101 is moved by the motor 1109 toward the film surface to scan the video image range of the film 1102, and light emitted from the lamp 1103 and passing through the film 1102 is received by the line sensor 1107. A video signal output from the line sensor 1107 in accordance with the received light is transmitted to the control circuit 1111. Upon completion of the scanning for the video image range of the film 1102, the control circuit 1111 turns off the lamp 1103 and drives the motor 1109 to return the original table 1101 to an initial position.

With the above procedure, the film scanner reads the image information of the film 1102 fixed to the original table 1101. The read image information can be used in an external device such as a personal computer.

However, on the optical path used when the light emitted from the lamp 1103 reaches the line sensor 1107, the aperture unit 1108 is arranged, and the aperture of the aperture unit 1108 is adjusted to adjust an amount of light being incident on the line sensor 1107. For this reason, the following drawbacks are generated.

Since the aperture unit 1108 for adjusting an amount of light being incident on the line sensor 1107 must be arranged, the film scanner has a complex structure. In addition, since the film scanner must comprise the control circuit for controlling the operation of the motor 1110, the film scanner cannot be easily reduced in size.

An image signal output from the CCD includes random noise and noise generated by a variation in dark current. FIGS. 31A and 31B show image signal outputs from the CCD in a state wherein incident light is interrupted. FIG. 31A shows a dark current output from the CCD at 25° C. for an accumulation time of 10 msec, and the variation in dark current is about 4 mV.

This dark current has a value changed depending on a temperature and an accumulation time. For example, FIG. 31B shows an image signal output from the CCD when the temperature and the accumulation time in the state in FIG. 31A increase by α° C. and β msec, respectively. It is understood that the level of the dark current is high as a whole.

Due to such a dark current, the ratio of an image signal and noise of an image of a high-density portion of, especially, a negative film or the like has an equal level. For this reason, when the image is displayed, stripes may be formed in a sub-scanning direction. Therefore, in the prior art, an image process such as smoothing or averaging is performed to an image signal to make the stripes inconspicuous. However, since the sharpness of the image is degraded, image quality is degraded.

As an illumination light source of the film original reading apparatus, a halogen lamp, a fluorescent lamp, an LED, and the like are used. These lamps are selectively used depending on applications. For example, a high-speed reading operation is to be performed, a halogen lamp, a fluorescent lamp, or the like is used as a brighter light source to increase illuminance on a film surface. In addition, when the apparatus is desired to be reduced in size, an LED may be used as a light source which generate a small amount of heat.

However, when a halogen lamp or a fluorescent lamp is used as a light source, the light source generate a large amount of heat. For this reason, in-focus precision is degraded by waviness generated on a film surface by the heat, or the film itself may be damaged. In order to solve this problem, the interval between the light source and the film is increased such that the film is not adversely affected by heat from the light source, or a cooling fan is arranged. As a result, the apparatus cannot be easily reduced in size. In addition, since a time from the light source is turned on to when an amount of light is stable is long, the ON state of the light source must be kept before the film image is read regardless of a reading operation.

On the other hand, when an LED is used as a light source, illuminance on the film surface decreases because the absolute luminance of the light source is low, and a line sensor or an area sensor takes a long accumulation time. For this reason, a reading speed can not be increased disadvantageously.

SUMMARY OF THE INVENTION

The present invention has been made to solve the above problems, and has as its object to provide a compact image reading apparatus for reading an image with high quality.

In order to achieve this object, an image reading apparatus according to the present invention is characterized by comprising the following arrangement.

That is, an image reading apparatus comprises reading device for reading an image, moving device for performing relative movement between the image and the reading device, density detection unit for detecting the density level of the image, lighting device for irradiating light on the image, and control unit for controlling a relative moving speed between the image and the reading device moved by the moving device and an amount of light irradiated by the lighting device, in accordance with the density level detected by the density detection unit.

The image reading apparatus is also characterized by comprising reading device for reading an image, density detection unit for detecting the density level of the image, first and second exposure adjustment units for adjusting exposure when the reading device reads the image, and control unit for, when the density level capable of being detected by the density detection unit is pre-divided into three regions, causing the first exposure adjustment unit to adjust the exposure when the detected density level is included in a first region, and causing the second exposure adjustment unit to adjust the exposure when the detected density level is included in either second or third regions which sandwich the first region therebetween.

The image reading apparatus is also characterized by comprising reading device for reading an image, moving device for relatively moving the image and the reading device to scan the image, lighting device for irradiating light on the image, designation unit for designating the image region which is read by the reading device, and control unit for changing amount of light irradiated by the lighting device such that an amount of light when the designated image region is scanned by the moving device and the amount of light when an image region which does not include the designated image region in the image is scanned by the moving device are different from each other.

The image reading apparatus is also characterized by comprising lighting device for irradiating light on an image recorded on a film, a line sensor having a photoelectric conversion element, an optical system for focusing light which is part of the light irradiated on the film by the lighting device and passed through the film,holding device for holding the film such that the film can move along a guide member, and moving device for moving the holding device such that the film crosses an optical axis of the optical system, wherein a cold-cathode ray tube is used as a light source of the lighting device to make the distance between a light-emitting surface of the cold-cathode ray tube and the film shorter than 20 mm.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

FIG. 11 is a view showing a table for determining a motor drive speed of a film scanner according to the third embodiment.

FIG. 12 is a view showing a table for determining a motor drive speed and a lamp luminance of the film scanner according to the third embodiment.

FIG. 29 is a flow chart showing a reading operation of the eighth embodiment of the present invention.

FIG. 30 is a schematic view showing the arrangement of a conventional film scanner.

FIGS. 31A and 31B are graphs showing noise signals in a general line sensor.

DESCRIPTION OF THE PREFERRED EMBODIMENTS

<First Embodiment>

A film scanner according to the first embodiment in which the present invention is performed will be described with reference to FIGS. 1 to 5.

Figure 1:
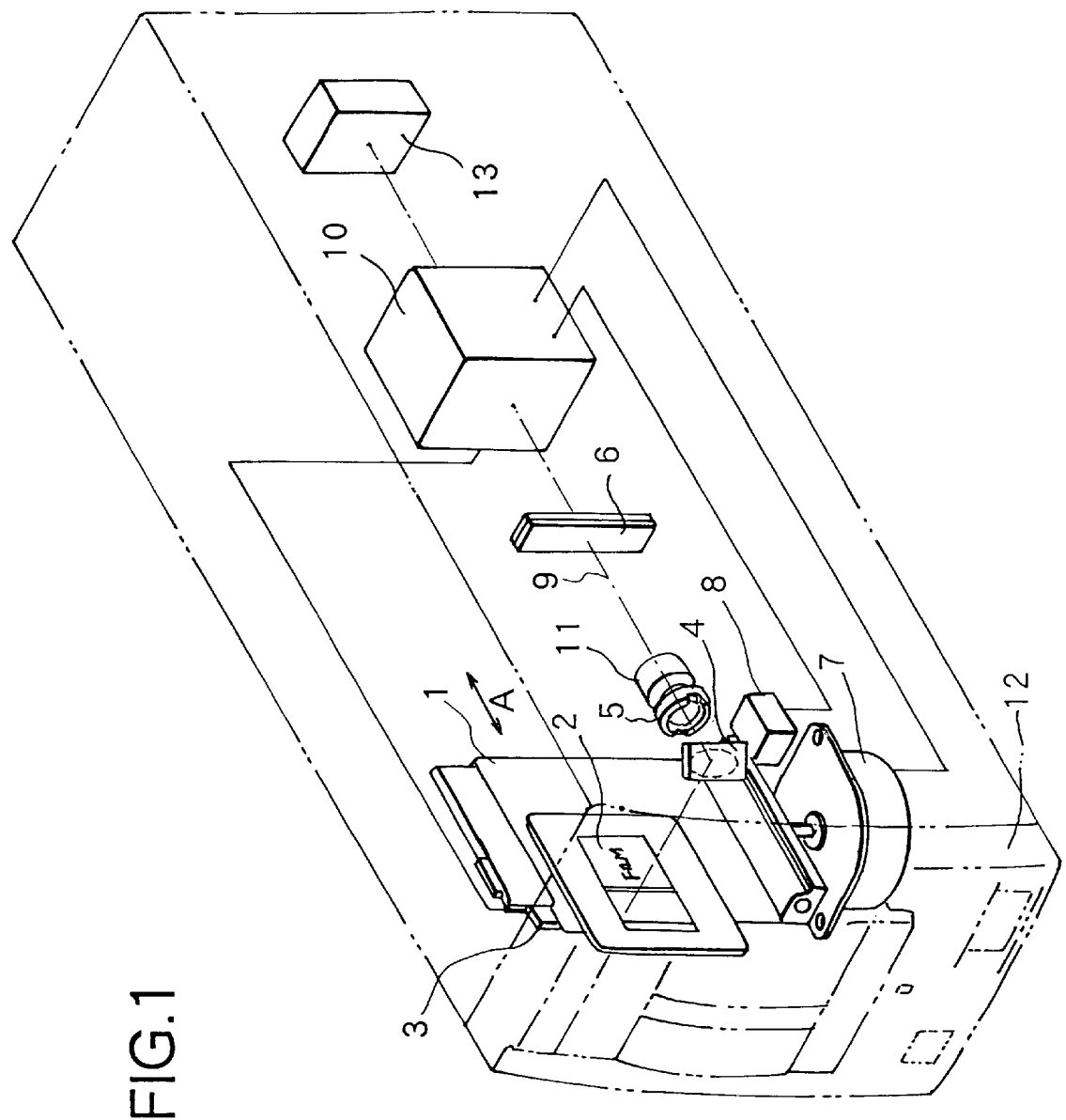
FIG. 1 is a perspective view showing a main part of a film scanner according to the first embodiment.
Figure 2:
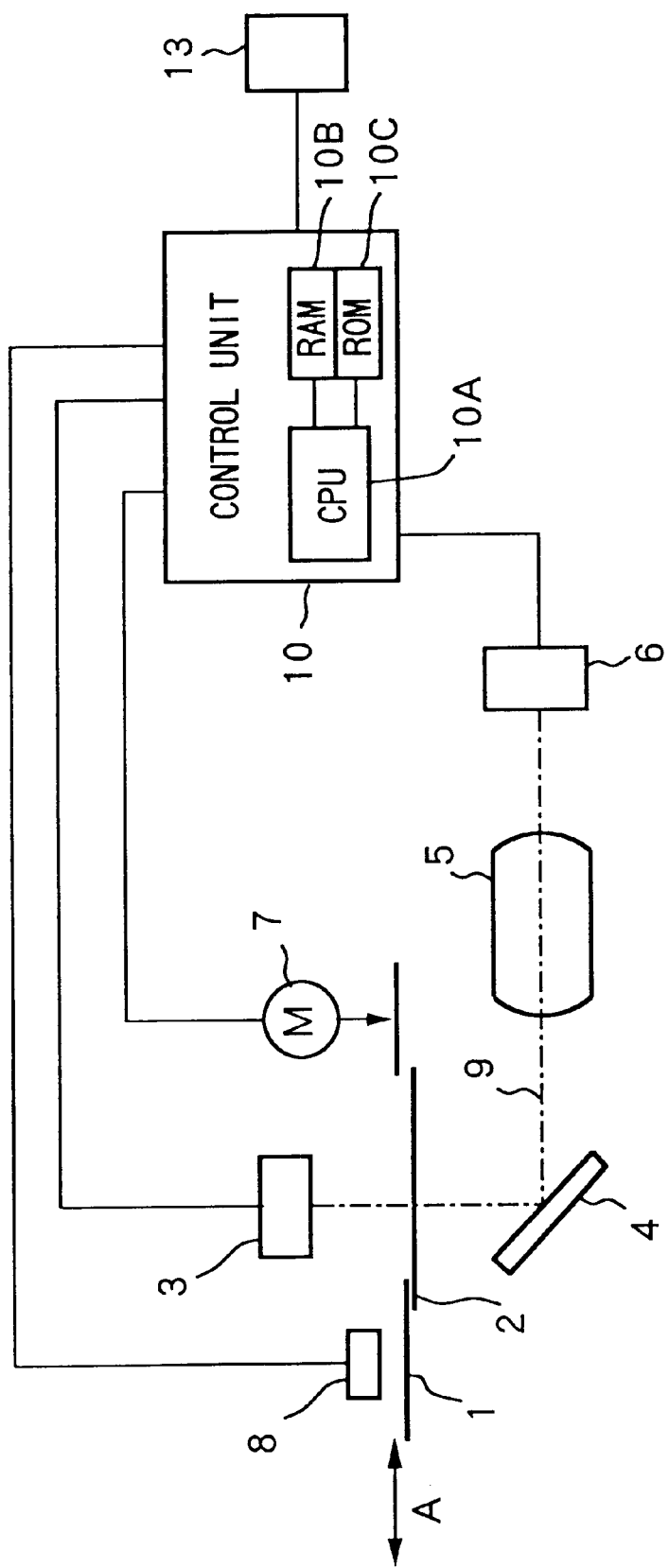
FIG. 2 is a schematic view showing the arrangement of the film scanner according to the first embodiment.

FIG. 1 is a perspective view showing a main part of the film scanner, and FIG. 2 is a schematic view showing the arrangement of the film scanner. Referring to FIGS. 1 and 2, reference numeral 1 denotes a film carriage used as an original table. Reference numeral 2 denotes a developed film on which an image serving as an original is recorded. Reference numeral 3 denotes a lamp serving as a light source. For example, a fluorescent lamp is used as the lamp 3. Reference numeral 4 denotes a mirror; 5, a lens; and 6, a line sensor serving as a reading device constituted by a CCD (Charge Coupled Device). Light irradiated from the lamp 3 passes through the film 2 and is reflected by the mirror 4 to be bent at 90°. The light is focused on the line sensor 6 by the lens 5. Reference numeral 9 denotes an optical axis.

Reference numeral 7 denotes a motor serving as a moving device for moving the film carriage 1 in a scanning direction (direction of arrow A in FIGS. 1 and 2); 8, a sensor for detecting the position of the film carriage 1; and 10, a control unit serving as a control unit. Reference numeral 11 denotes a lens holder for holding the lens 5; 12, an outer case of the film scanner; and 13, an input/output terminal for transmitting/receiving a signal to/from an external device. The lamp 3 serving as a light source, the line sensor 6, the motor 7, the sensor 8, and the input/output terminal 13 are electrically connected to the control unit 10. The control unit 10 comprises a CPU 10A, a RAM 10B, and a ROM 10C. A control map, a control program, and the like are stored in the ROM 10C. The CPU 10A entirely controls the film scanner according to the control program in the ROM 10C.

Figure 3:
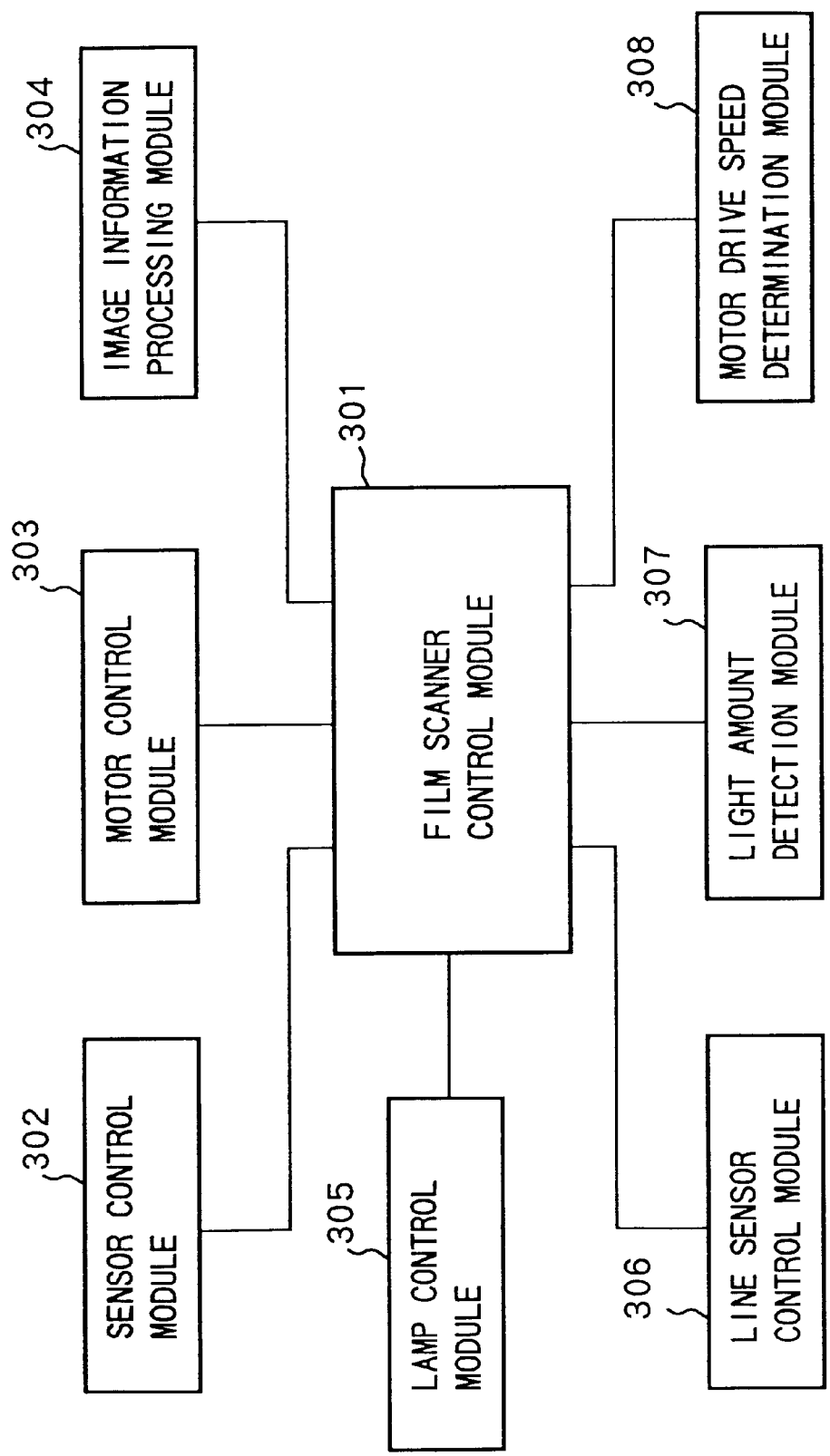
FIG. 3 is a block diagram showing the arrangement of the film scanner according to the first embodiment.

The arrangement of control for the film scanner by the control unit 10 will be described below. FIG. 3 is a block diagram for explaining the arrangement of the control unit 10 in detail. In the following description, it is assumed that the respective modules in the control unit 10 represent software (program) and hardware (electronic circuit) for realizing the functions of the modules. As shown in FIG. 3, the control unit 10 is constituted by a film scanner control module 301 serving as a central module, a sensor control module 302, a motor control module 303, an image information processing module 304, a lamp control module 305, a line sensor control module 306, a light amount detection module 307 serving as a density detection circuit, and a motor drive speed determination module 308.

Figure 4:
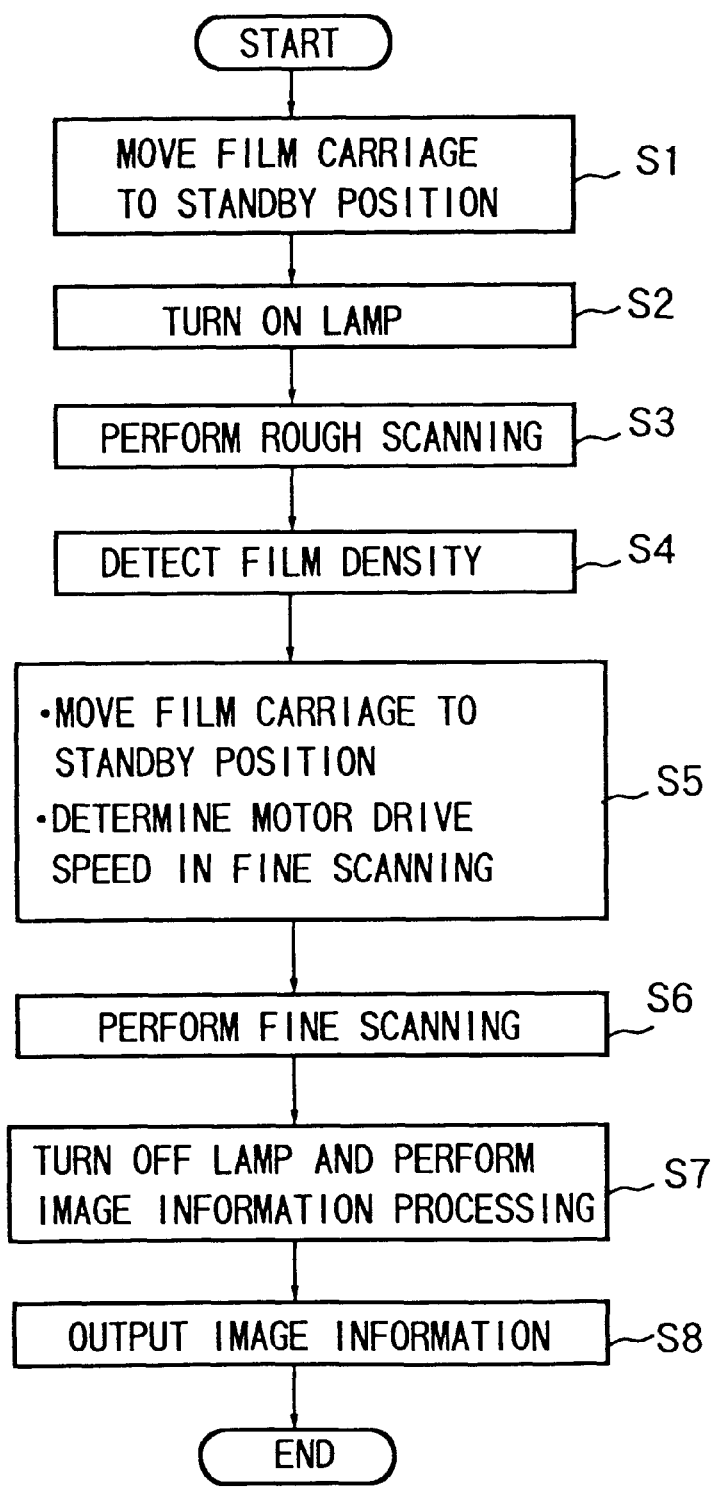
FIG. 4 is a flow chart for explaining the operation of the film scanner according to the first embodiment.

An image reading method controlled by the control unit 10 in the film scanner having the above arrangement will be described below with reference to the flow chart in FIG. 4.

When a command of a film reading operation is input from an external device (not shown) such as a personal computer through the input/output terminal 13, the position of the film carriage 1 is detected by the sensor 8 and the sensor control module 302, and the information is transmitted to the film scanner control module 301. The motor 7 is driven by the motor control module 303 to cause the film carriage 1 to stand by at a predetermined standby position, thereby moving the film carriage 1 to the standby position (step S1).

The lamp 3 is turned on by the lamp control module 305 (step S2), and the motor 7 is rotated at a predetermined speed by the motor control module 303 to scan an image region of the film 2 at a predetermined scanning speed along a film surface, so that a rough-scanning operation is performed (step S3).

Image information is transmitted to the line sensor control module 306 by the line sensor 6 during the rough-scanning operation. The light transmittance of the film 2, i.e., a film density, is detected by the light amount detection module 307 on the basis of the information (step S4).

Figure 5:
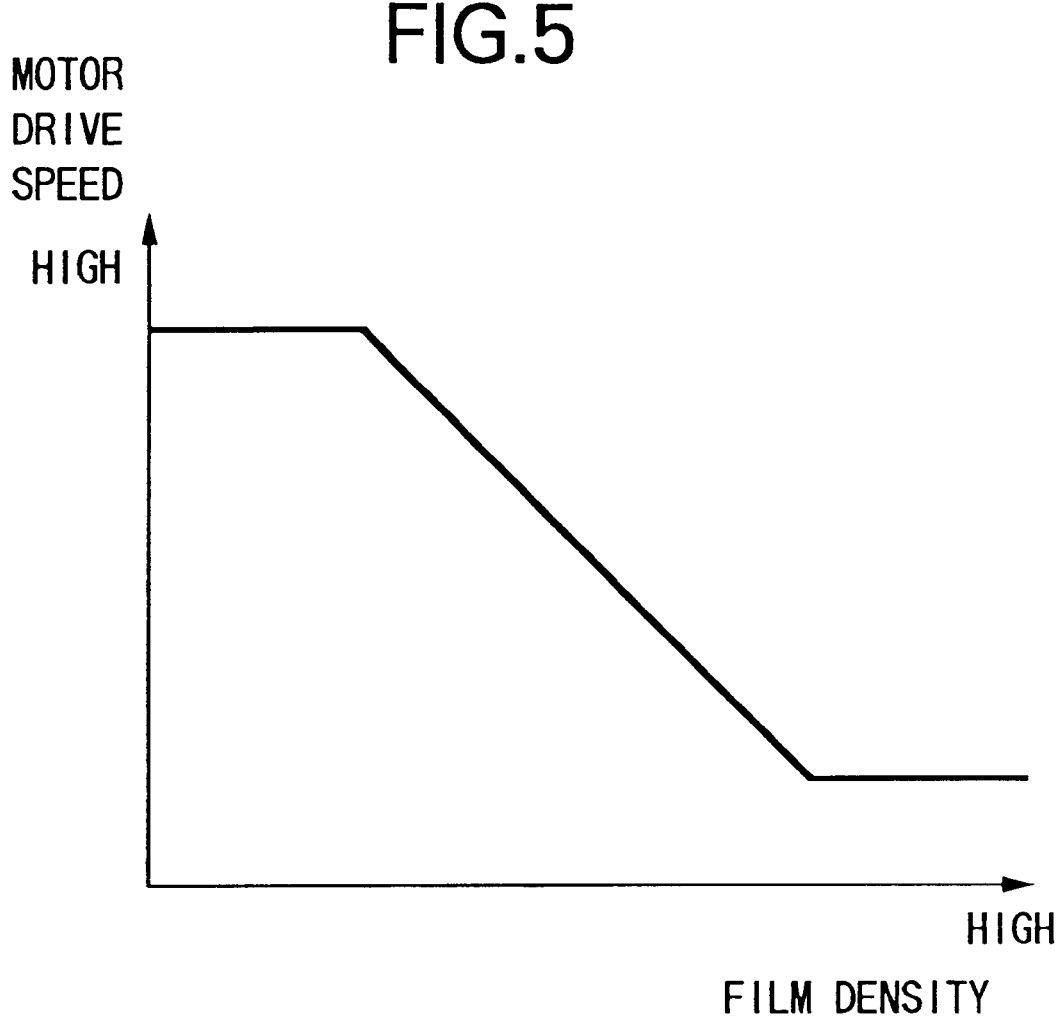
FIG. 5 is a graph showing a control map for determining a motor drive speed of the film scanner according to the first embodiment.

Upon completion of the rough-scanning operation, on the basis of the film density of the entire area of the detected film, a motor drive speed in a fine-scanning operation is determined by the motor drive speed determination module 308 according to the control map in FIG. 5 and stored in the ROM 10C in advance to obtain an appropriately exposed image. At the same time, the motor 7 is rotated to move the film carriage 1 to a predetermined standby position (step S5). Here, the motor drive speed is determined in such a manner that the scanning speed becomes slow as the detected film density increases.

The motor 7 is rotated at the determined motor drive speed by the motor control module 303 to perform a fine-scanning operation. Accumulation time of electric charges in the line sensor 6 changes depending on the determined motor drive speed. During the fine-scanning operation, image information formed by the line sensor 6 is transmitted to the image information processing module 304 through the line sensor control module 306 (step S6).

Upon completion of the fine-scanning operation, the lamp 3 is turned off by the lamp control module 305, and, at the same time, image information processing is performed by the image information processing module 304 (step S7). Image information is output from the input/output terminal 13 (step S8), and the operation is ended.

According to the apparatus described above, the motor drive speed of the motor in the image reading apparatus can be controlled depending on the detected film density. Therefore, the image reading apparatus can perform a high-quality image reading operation with appropriate exposure without an aperture unit.

<Second Embodiment>

A film scanner according to the second embodiment in which the present invention is performed will be described below with reference to FIGS. 6 to 10. Since the film scanner according to this embodiment is basically the same arrangement as that of the film scanner described in the first embodiment except for a control unit, a description thereof will be omitted.

Figure 6:
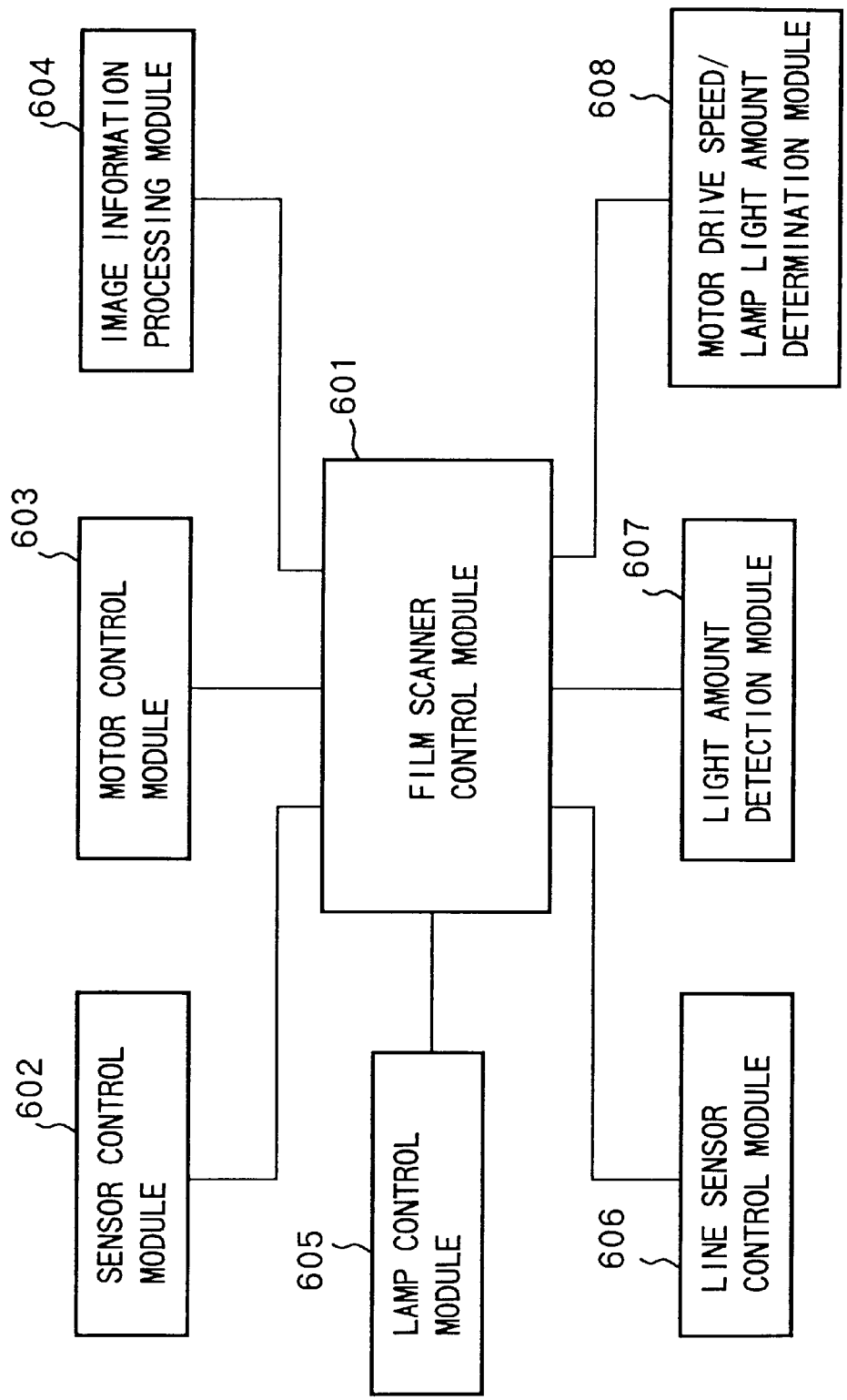
FIG. 6 is a block diagram showing the arrangement of a film scanner according to the second embodiment.

FIG. 6 shows the arrangement of a control unit of this film scanner. A control unit 10 according to this embodiment is constituted by a film scanner control module 601 serving as a central module, a sensor control module 602, a motor control module 603, an image information processing module 604, a lamp control module 605, a line sensor control module 606, a light amount detection module 607 serving as a density detection circuit, and a motor drive speed/lamp light amount determination module 608 serving as first and second exposure adjusting units and a light amount adjusting unit. As in this embodiment, it is assumed that the respective modules represent software (program) and hardware (electronic circuit) for realizing the functions of the modules.

Figure 7:
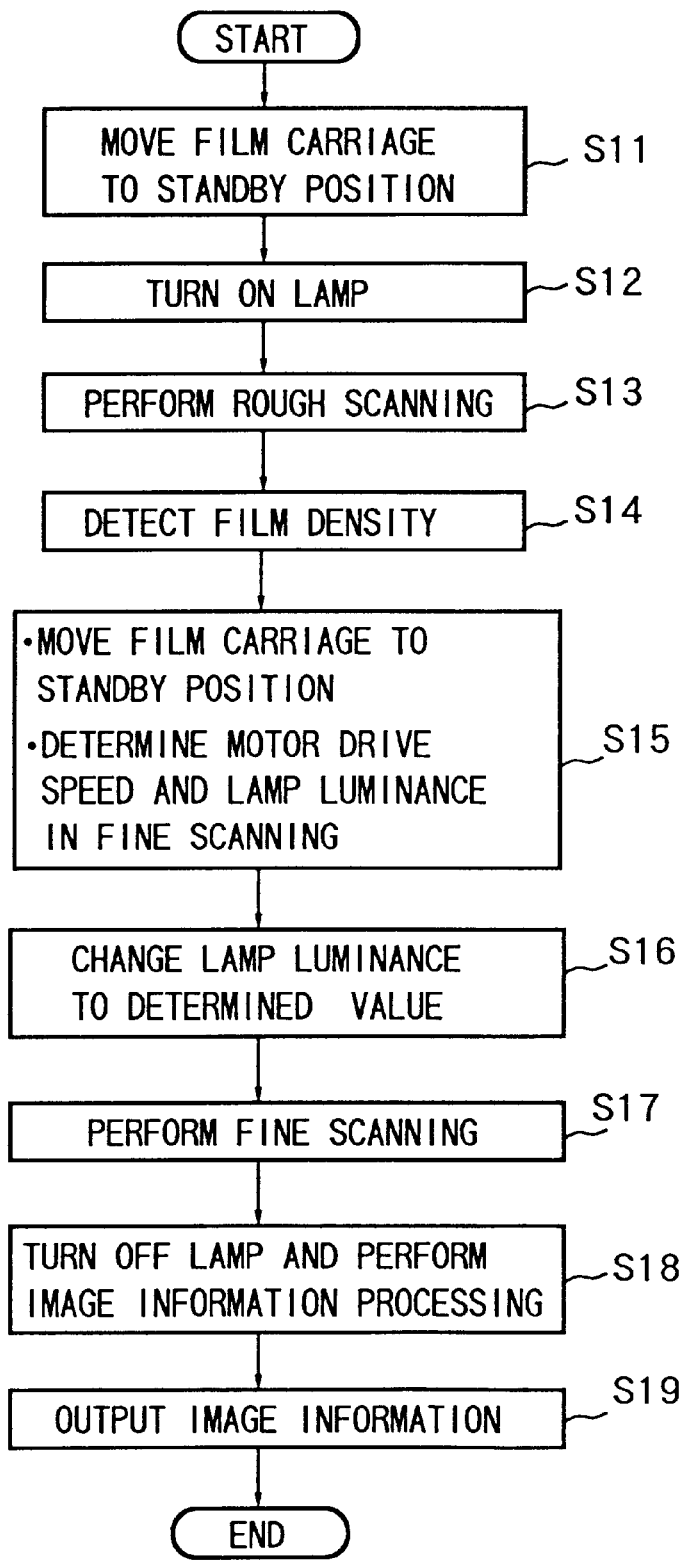
FIG. 7 is a flow chart for explaining the operation of the film scanner according to the second embodiment.

An image information reading method, for a film 2, using the film scanner having the above arrangement will be described below with reference to the flow chart in FIG. 7.

When a command of a film reading operation is input from an external device (not shown) through the input/output terminal 13, the position of the film carriage 1 is detected by the sensor 8 and the sensor control module 602, and the information is transmitted to the film scanner control module 601. The motor 7 is driven by the motor control module 603 to cause the film carriage 1 to stand by at a predetermined standby position, thereby moving the film carriage 1 to the standby position (step S11).

The lamp 3 is turned on at a predetermined luminance by the lamp control module 605 (step S12), and the motor 7 is rotated at a predetermined speed by the motor control module 603 to scan an image region of the film 2 at a predetermined scanning speed along a film surface, so that a rough-scanning operation is performed (step S13).

Image information is transmitted to the line sensor control module 606 by the line sensor 6 during the rough-scanning operation. The light transmittance of the film 2, i.e., a film density, is detected by the light amount detection module 607 on the basis of the information (step S14).

Figure 8:
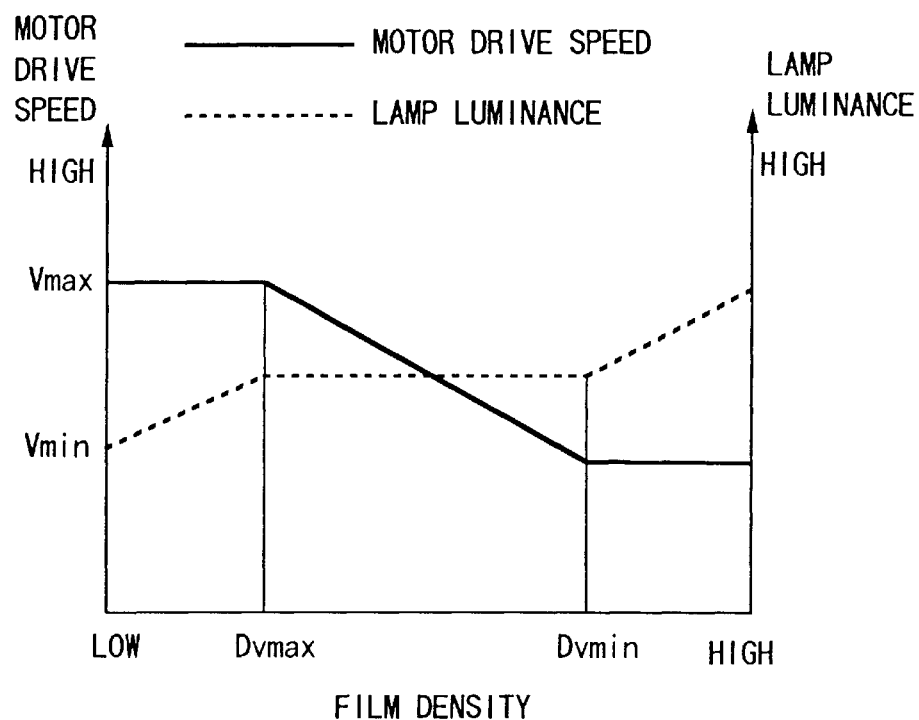
FIG. 8 is a graph showing a control map for determining a motor drive speed and a lamp luminance of the film scanner according to the second embodiment.

Upon completion of the rough-scanning operation, on the basis of the film density of the entire area of the detected film, a motor drive speed and a lamp luminance in a fine-scanning operation are determined by the motor drive speed/lamp light amount determination module 608 according to the control map in FIG. 8 and stored in the ROM 10C in advance to obtain an appropriately exposed image. At the same time, the motor 7 is rotated to move the film carriage 1 to a predetermined standby position (step S15).

The luminance of the lamp 3 is changed by the lamp control circuit 605 into a determined value (step S16), and the motor 7 is rotated at a predetermined motor drive speed by the motor control module 603, thereby performing a fine-scanning operation (step S17).

During the fine-scanning operation, image information is transmitted by the line sensor 6 to the image information processing module 604 through the line sensor control module 602. Upon completion of the fine-scanning operation, the lamp 3 is turned off by the lamp control module 605, and, at the same time, image information processing is performed by the image information processing module 604 (step S18).

Image information is output from the input/output terminal 13 (step S19), thereby completing the operation.

Determination of a motor drive speed and a lamp luminance according to this embodiment is performed on the basis of the control map in FIG. 8. More specifically, according to the control map in FIG. 8, when the motor drive speed ranges from the maximum value Vmax to the minimum value Vmin, the lamp luminance is set to be constant. Depending on the change in motor drive speed, when an image having an appropriate light amount cannot be obtained, i.e., when the film density is lower than DVmax, and when the film density is higher than DVmin, the lamp luminance is changed. In this manner, an image having appropriate exposure can be obtained.

By performing the control as described above, like an inexpensive lamp or motor, when a lamp whose lifetime tends to be short when the lamp luminance is frequently changed, a lamp such as a fluorescent lamp whose light amount cannot be adjusted, or a motor whose speed changeable range is relatively narrow is used, an image having appropriate exposure can be obtained in a wide film density range from a low density to a high density. A film density is often intermediate (film density which is DVmax or more and DVmin or less). For this reason, the present invention can sufficiently cope with a case wherein a lamp or a motor which is inexpensive and has not very good performance is used.

Figure 9:
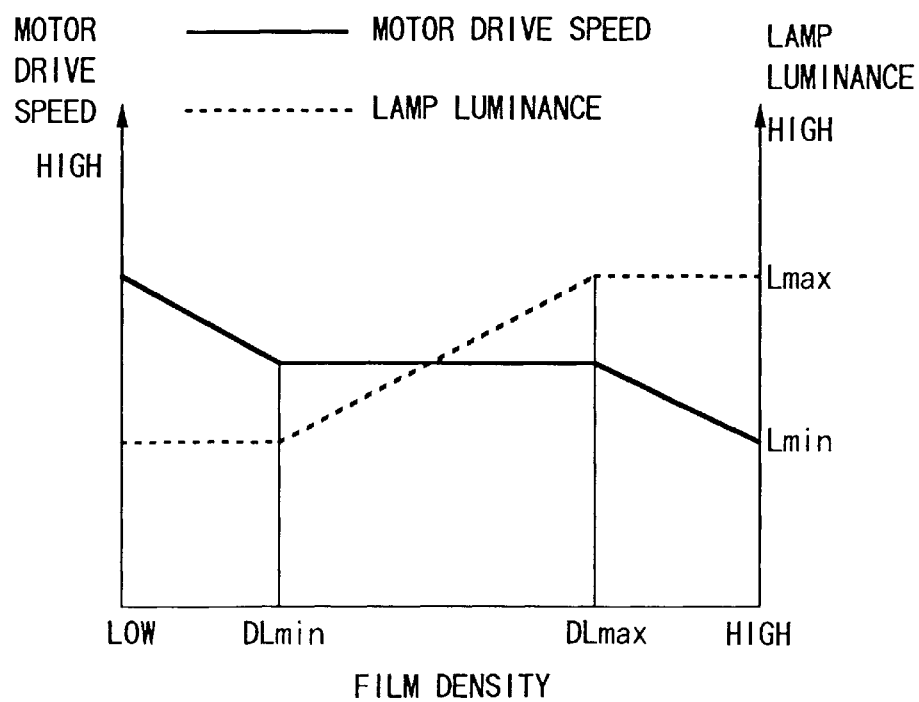
FIG. 9 is a graph showing a control map for determining a motor drive speed and a lamp luminance of the film scanner according to the second embodiment.

Determination of the motor drive speed and the lamp luminance can also be performed according to the control map shown in FIG. 9. In this case, when the lamp luminance ranges from the maximum Lmax to the minimum value Lmin, the motor drive speed is set to be constant. Depending on the change in lamp luminance, when an image having appropriate exposure cannot be obtained, i.e., when the film density is lower than DLmin, or when the film density is higher than DLmax, the motor drive speed is changed. When the film density ranges from DLmin and DLmax, an image having appropriate exposure can be obtained by changing the lamp luminance.

With the above arrangement, when a motor whose motor drive speed cannot be easily changed is used, an image having appropriate exposure can be obtained in a wide film density range from a low density to a high density. As in the above case, in this case, a film density is often intermediate (film density which is DLmax or more and DLmin or less). For this reason, the present invention can sufficiently cope with the motor whose drive speed cannot be easily changed.

Figure 10:
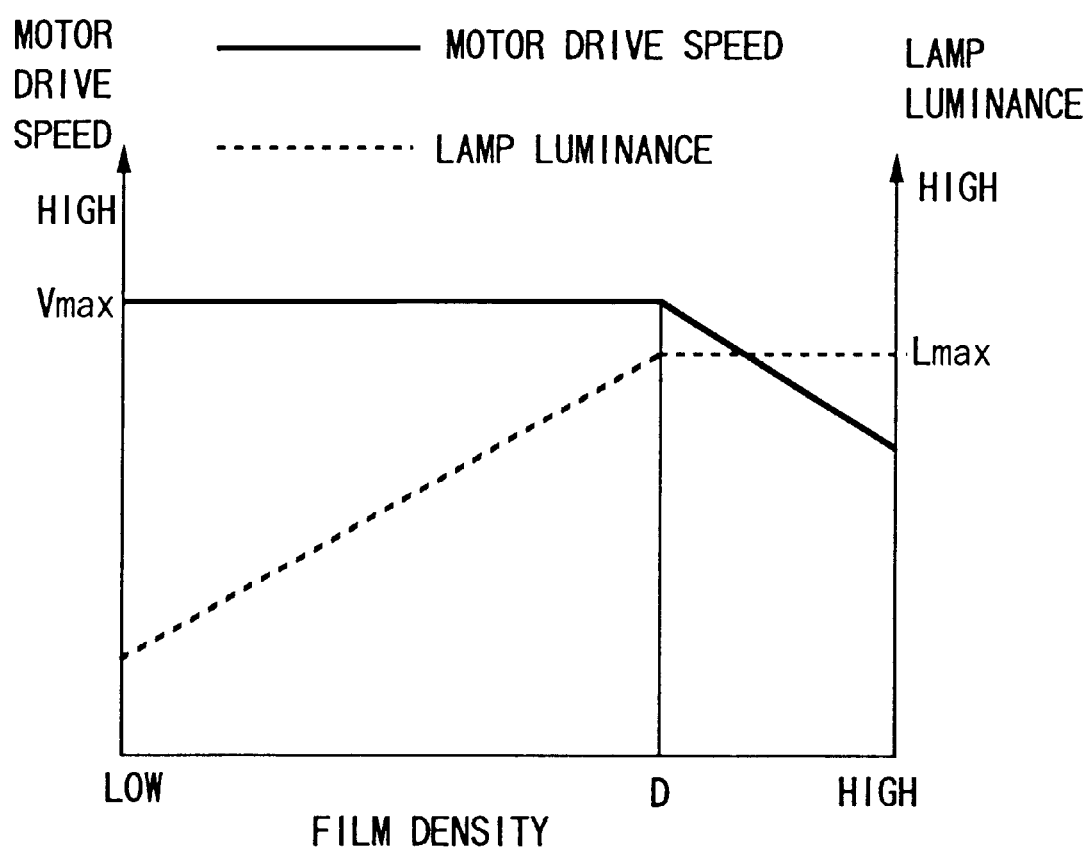
FIG. 10 is a graph showing a control map for determining a motor drive speed and a lamp luminance of the film scanner according to the second embodiment.

FIG. 10 shows another control map. In FIG. 10, when the film density is D or less, the motor drive speed is fixed to the maximum speed Vmax, and only the lamp luminance is changed, so that an image having appropriate exposure can be obtained. When the film density exceeds D, the lamp luminance is set to the maximum value Lmax, and the motor drive speed is changed, so that an image having appropriate exposure can be obtained.

More specifically, according to the control map in FIG. 10, in general, the motor drive speed is fixed to the maximum speed Vmax, and the lamp luminance is changed to adjust the exposure of an image. The film density is high, and the lamp luminance reaches the maximum value Lmax (film density at this time is D), so that an image having appropriate exposure cannot be obtained by adjusting the lamp luminance. In this case, exposure adjustment is performed by reducing the motor drive speed. In this manner, an image having appropriate image can be obtained.

With the above arrangement, a film image is generally read such that a motor drive speed is set to the maximum Vmax. For this reason, an effect of considerably shortening a reading time can be obtained. The motor drive speed and the lamp luminance are not limited to those determined by the control map. The motor drive speed and the lamp luminance can be determined by any method. For example, the motor drive speed and the lamp luminance can be simultaneously changed depending on a film density.

<Third Embodiment>

In the first embodiment, a motor drive speed is determined according to the detailed control map as shown in FIG. 5. However, the range of the density level of a film whose image information can be read by the film scanner may be divided into a plurality of levels (four levels D1 to D4) as in the control table shown in FIG. 11, and motor drive speeds (V1 to V4) corresponding to the levels D1 to D4) may be determined. This control table is stored in the ROM 10C in place of the above-described control map, as a matter of course.

Similarly, in the second embodiment, the control map for determining a motor drive speed and a lamp luminance in a fine-scanning operation is not limited to the control maps shown in FIGS. 8 to 10, and the control map shown in FIG. 12 can be used. In FIG. 12, the range of the film density is divided depending on the density level of the film, a specific level of the levels D1 to D4 in which the film density detected by the film scanner is determined, and a motor drive speed (V1 to V4) and a lamp luminance (L1 to L4) corresponding to the determined level in a fine-scanning operation are determined.

Here, the control tables shown in FIGS. 11 and 12, the range of the density of a film whose image information can be read are divided by four. However, any number of levels may be used, as a matter of course.

Control based on the control maps shown in FIGS. 5 and 8 to 10 is not performed, and the control tables shown in FIGS. 11 and 12 are stored to determine a motor drive speed and a lamp luminance. In this case, as compared with the case wherein the control maps shown in FIGS. 5 and 8 to 10 are stored, although an amount of light being incident on a line sensor is hard to be carefully adjusted, an information amount of a control map stored to determine a motor drive speed and a lamp luminance can be considerably reduced.

<Fourth Embodiment>

Figure 14:
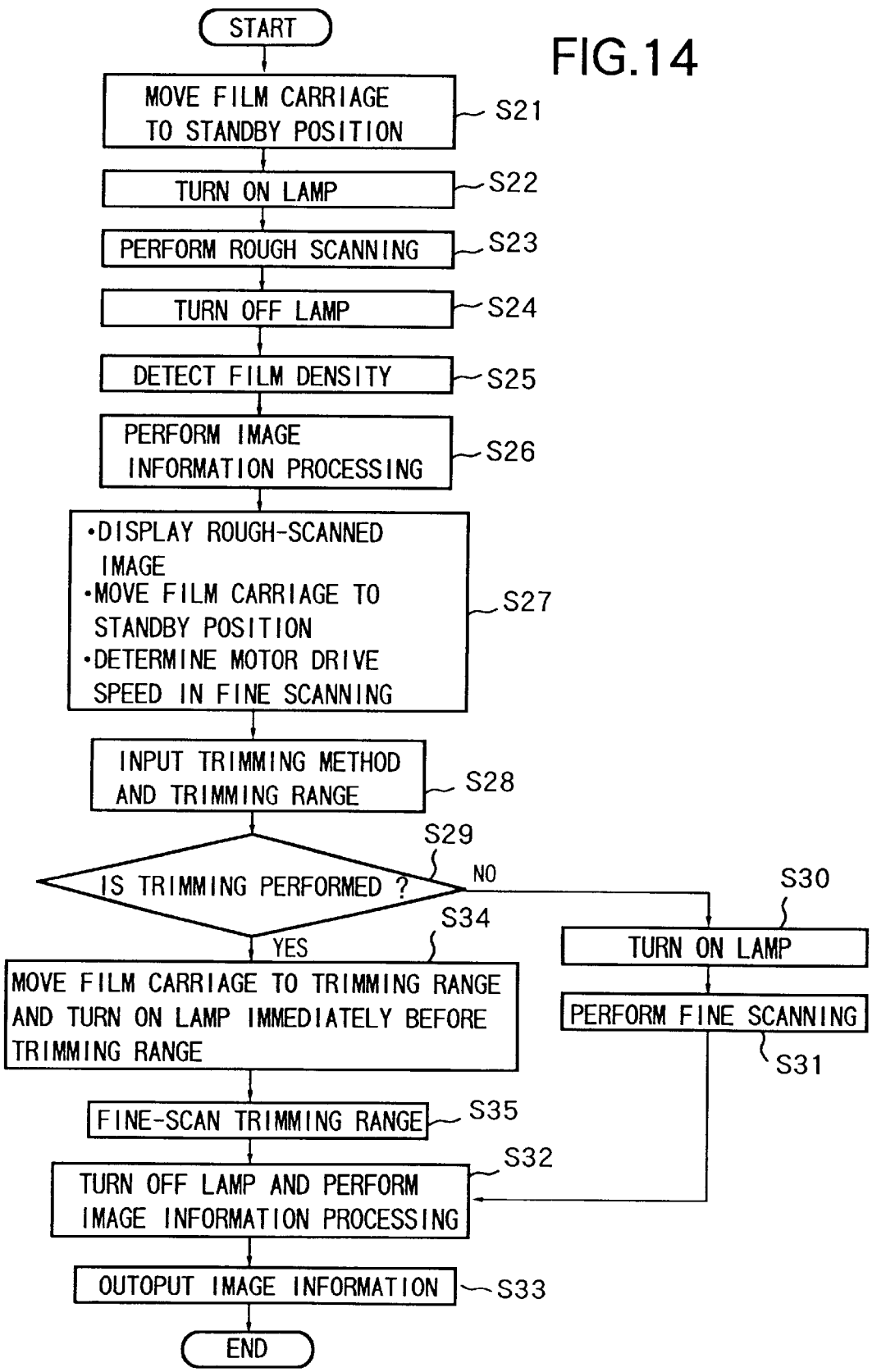
FIG. 14 is a flow chart for explaining an operation of the film scanner according to the fourth embodiment.
Figure 15:
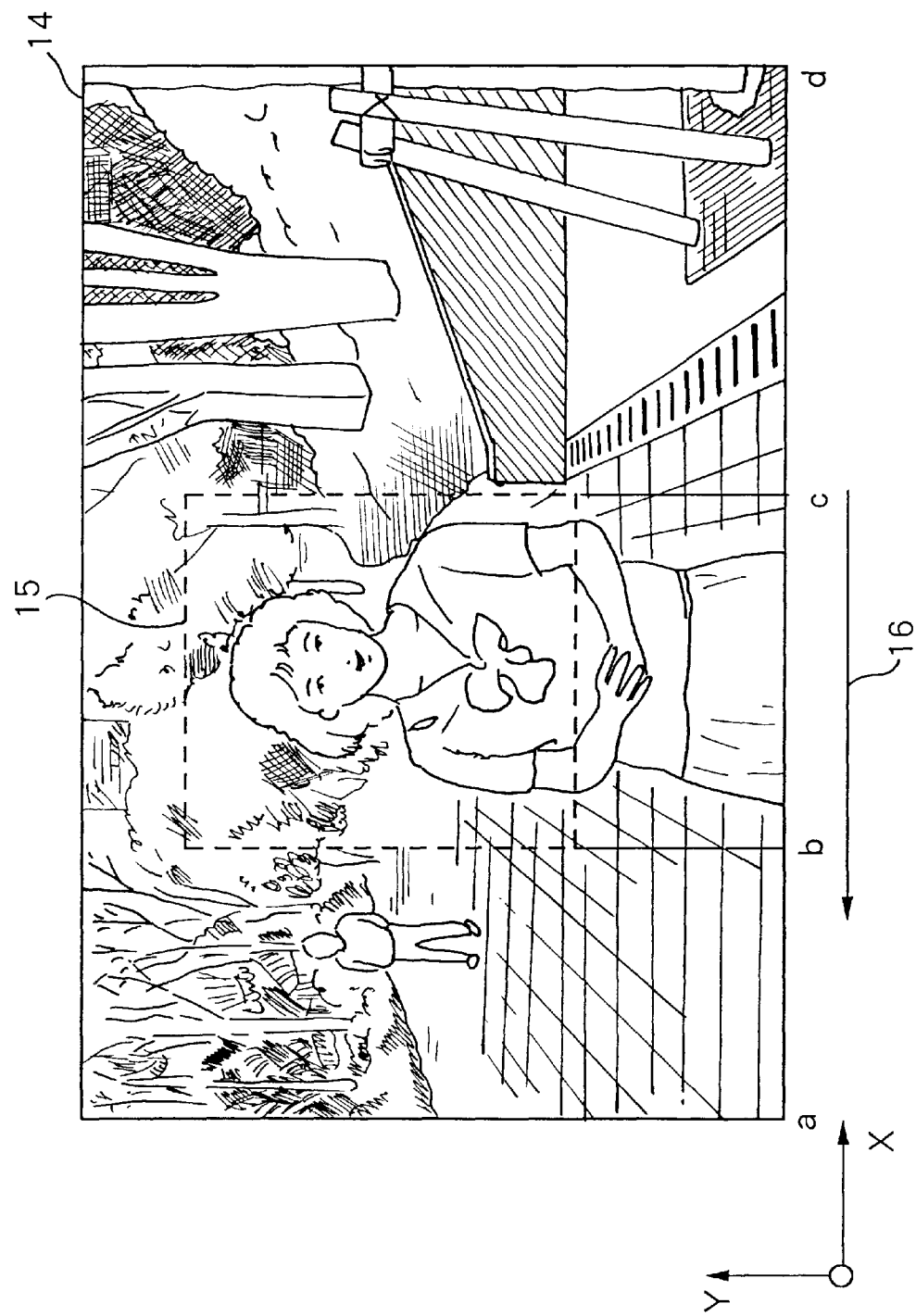
FIG. 15 is a view for explaining a trimming operation of the film scanner according to the fourth embodiment.

A film scanner according to the fourth embodiment will be described below with reference to FIGS. 13 to 15. Since this embodiment is basically the same as the first embodiment except for a control unit, a description except for the control unit will be omitted.

Figure 13:
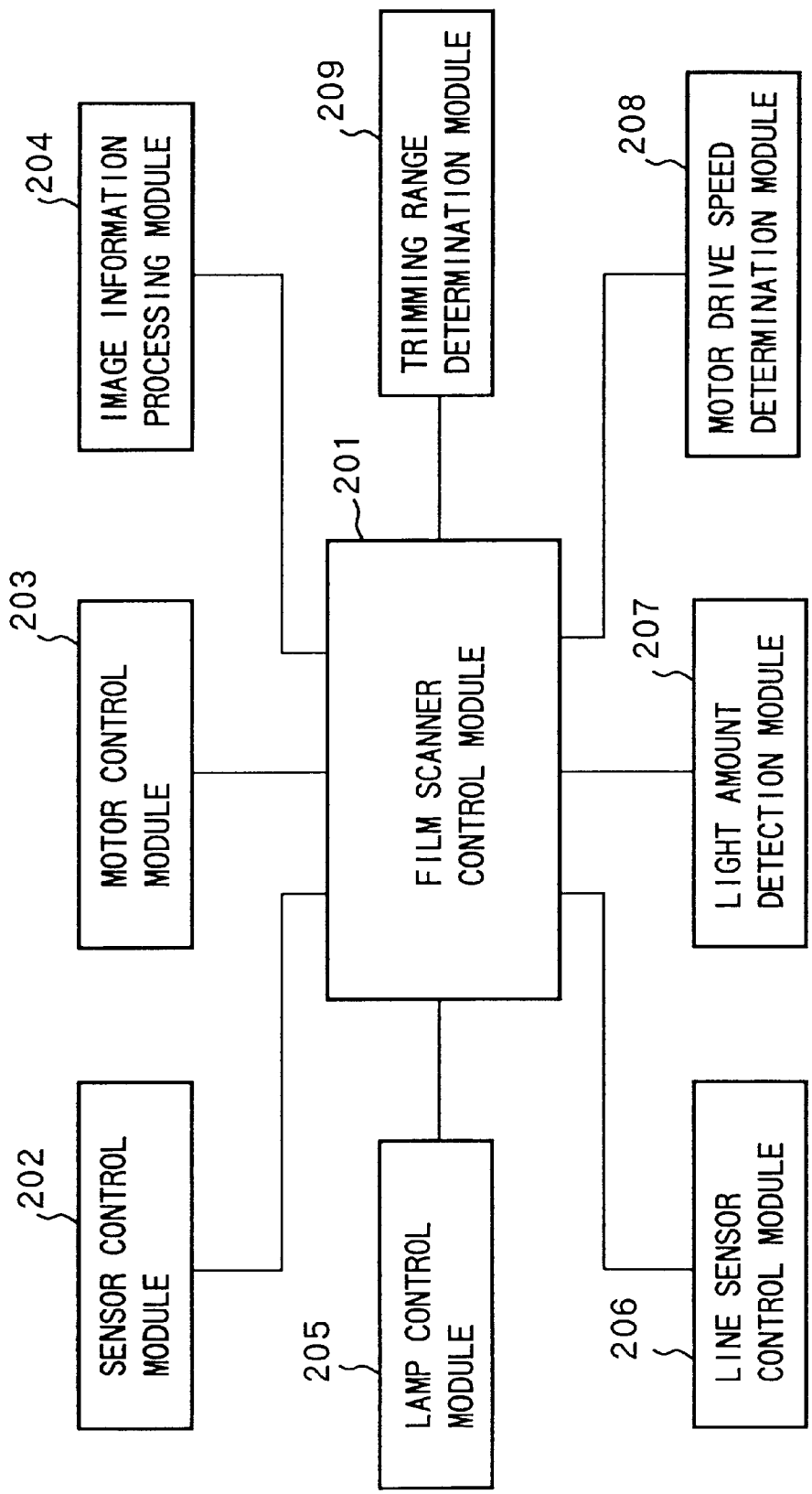
FIG. 13 is a block diagram showing the arrangement of a film scanner according to the fourth embodiment of the present invention.

A control unit 10 serving as a control unit of the film scanner according to this embodiment, as shown in FIG. 13, is constituted by a film scanner control module 201 serving as a central module, a sensor control module 202, a motor control module 203, an image information processing module 204, a lamp control module 205, a line sensor control module 206, a light amount detection module 207, and a motor drive speed determination module 208, and a trimming range determination module 209 serving as a designation unit. As in this embodiment, the respective modules represent software (program) and hardware (electronic circuit) for realizing the functions of the modules.

An image information reading method, for a film, using the film scanner having the above arrangement will be described below with reference to the flow chart in FIG. 14.

When a command of a film reading operation is input from an external device (not shown) such as a personal computer connected to the film scanner through the input/output terminal 13, the position of the film carriage 1 is detected by the sensor 8 and the sensor control module 202, and the information is transmitted to the film scanner control module 201. The motor 7 is driven by the motor control module 203 to cause the film carriage 1 to stand by at a predetermined standby position, thereby moving the film carriage 1 to the standby position (step S21).

The lamp 3 is turned on at a predetermined luminance by the lamp control module 205 (step S22), and the motor 7 is rotated at a predetermined speed by the motor control module 203 to scan an image region of the film 2 at a predetermined scanning speed along a film surface, so that a rough-scanning operation is performed (step S23).

Image information is transmitted to the line sensor control module 206 by the line sensor 6 during the rough-scanning operation. The light transmittance of the film, i.e., a film density, is detected by the light amount detection module 207 on the basis of the information. Upon completion of the rough-scanning operation, the lamp is turned off by the lamp control module 205 (step S24).

When the film density of the entire film is detected (step S25), image information from the line sensor 6 is transmitted to the image information processing module 204 through the line sensor control module 206, and predetermined image information processing is performed (step S26).

The image information is transmitted to an external connection device by the input/output terminal 13, and a rough-scanned image is displayed on the monitor of the external connection device. FIG. 15 shows an image obtained such that an image printed on a film is rough-scanned to be displayed on the monitor of the external connection device. Reference numeral 14 denotes an outline of the film image; 15, a trimming frame; and 16, a moving direction (moving direction of the film carriage) of the film with respect to the film image. Positions a, b, c, and d indicate the left end of the outline of the film image, the left end of the trimming frame, the right end of the trimming frame, and the right end of the outline of the film image, respectively. The line sensor 6 is arranged such that the line sensor 6 can perform a read operation in units of lines having the Y-axis direction in FIG. 15 as a main scanning direction. When the film 2 is moved in the direction of arrow 16, the line sensor 6 can read the entire area of the film image. The standby position of the film carriage 1 is the position of the film carriage 1 when the optical axis 9 passes at a position on the film corresponding to the position a of the film image.

On the basis of the film density of the entire area of the detected film, a motor drive speed of the motor 7 in a fine-scanning operation is determined by the motor drive speed determination module 208 according to the control map in FIG. 5 and stored to obtain an appropriately exposed image. At the same time, the motor 7 is rotated to move the film carriage 1 to a predetermined standby position (step S27).

When a fine-scanning operation in which trimming is not performed is commanded by the external device (steps S28 and S29), this command is input through the input/output terminal 13, the lamp is turned on by the lamp control module 205 (step S30). The motor 7 is rotated at the determined motor drive speed by the motor control module 203, thereby performing a fine-scanning operation (step S31).

During the fine-scanning operation, image information is transmitted by the line sensor 6 to the image information processing module 204 through the line sensor control module 202. When the image of the film 2 up to the position d is read by the line sensor 6, the fine-scanning operation is completed.

Upon completion of the fine-scanning operation, the lamp 3 is turned off by the lamp control module 205, and, at the same time, predetermined image information processing is performed by the image information processing module 204 (step S32). The image information is output to the external device by the input/output terminal 13 (step S33), thereby completing the operation of the film scanner.

When the image of the film 2 obtained by a rough-scanning operation is displayed on the monitor of an external device, a trimming frame 15 is set by the external device, and a fine-scanning operation is instructed (step S28). In this case, information of the range of the trimming frame 15 is input through the input/output terminal 13 (step S29).

An image reading range of the film 2 for obtaining an image within the trimming range and an amount of movement of the film carriage 1 are determined by the trimming range determination module 209, the motor 7 is rotated by the motor control module 203 according to the information, and the film carriage is moved such that the optical axis 9 passes at a position on the film 2 corresponding to the position near the left side of the position b. The lamp 3 is turned on by the lamp control module 205 (step S34), and the motor 7 is rotated at a motor drive speed determined by the motor control module 203, thereby performing a fine-scanning operation (step S35).

During the fine-scanning operation, image information is transmitted by the line sensor 6 to the image information processing module 204 through the line sensor control module. When the image of the film 2 up to the position c is read by the line sensor 6, the fine-scanning operation is completed.

Upon completion of the fine-scanning operation, the lamp 3 is turned off by the lamp control module 205, and, at the same time, predetermined image information processing is performed by the image information processing module 204 (step S32). The image information in the trimming frame 15 is output to the external device by the input/output terminal 13 (step S33), thereby completing the operation.

Here, movement of the film carriage 1 is performed such that the motor is driven by the motor control module 203 while the position of the film carriage 1 is detected by all the sensors and the sensor control module 202.

Since the lamp 3 is turned on/off before/after the trimming range of the film 2 in the rough-scanning operation and the fine-scanning operation, the ON time of the lamp 3 can be shortened, and a power consumption can be reduced. The luminance of the lamp may be reduced to a level lower than that in the reading operation without completely turning off the lamp 3 even out of the film reading range. When the lamp is not suddenly turned on/off as described above, a load on the lamp 3 can be reduced, and the lifetime of the lamp 3 can be elongated.

In addition, in order to read a film image by trimming, the film carriage is moved to the film image reading range, the film carriage 1 is moved at a speed higher than that in the film image reading operation. In this case, a time from when the command of a film reading operation is input from an external device to when film image information is output can be shortened.

In the film scanner having no trimming function, when a motor drive speed is controlled such that the moving speed of the film carriage 1 is higher in operations except for a film image reading operation than in the film image reading operation, a time between when the command of a film reading operation is input from an external device when film image information is output can be shortened advantageously.

In addition, in each of the above embodiments, a stepping motor is arranged as the motor 7, and a drive pulse is generated by the electronic circuit of the motor control module. When the drive of the motor 7 is controlled by the drive pulse, the rotation direction, motor rotation amount, and motor drive speed (motor rotation speed) of the motor 7 can be accurately and easily controlled by the drive pulse. More specifically, the moving direction, moving amount, and moving speed of the film carriage can be accurately and easily controlled.

It is assumed that the sensor 8 is used as a switch such as a leaf switch, a photo interrupter, or a photo reflector, and that a film carriage is arranged to be detected at a predetermined position by the sensor 8. In this case, when motor drive pulses from the predetermined position are counted, the absolute position of the film carriage can be accurately detected.

More specifically, with the above arrangement, the sensor 8 can be constituted by a simple arrangement, and the position, moving direction, and moving speed of the film carriage can be accurately and easily controlled advantageously.

In each of the first to fourth embodiments, the lamp 3, the lens 5, the line sensor 6, and the like are fixed to a film scanner body, and the film carriage 1 and the film 2 are moved in the scanning direction by the motor 7, thereby reading a film image. However, the following arrangement may be used. That is, the film 2 is fixed with respect to the film scanner body, the lamp 3, the lens 5, the line sensor 6, and the like are moved in the scanning direction, thereby reading a film image.

<Fifth Embodiment>

Figure 16:
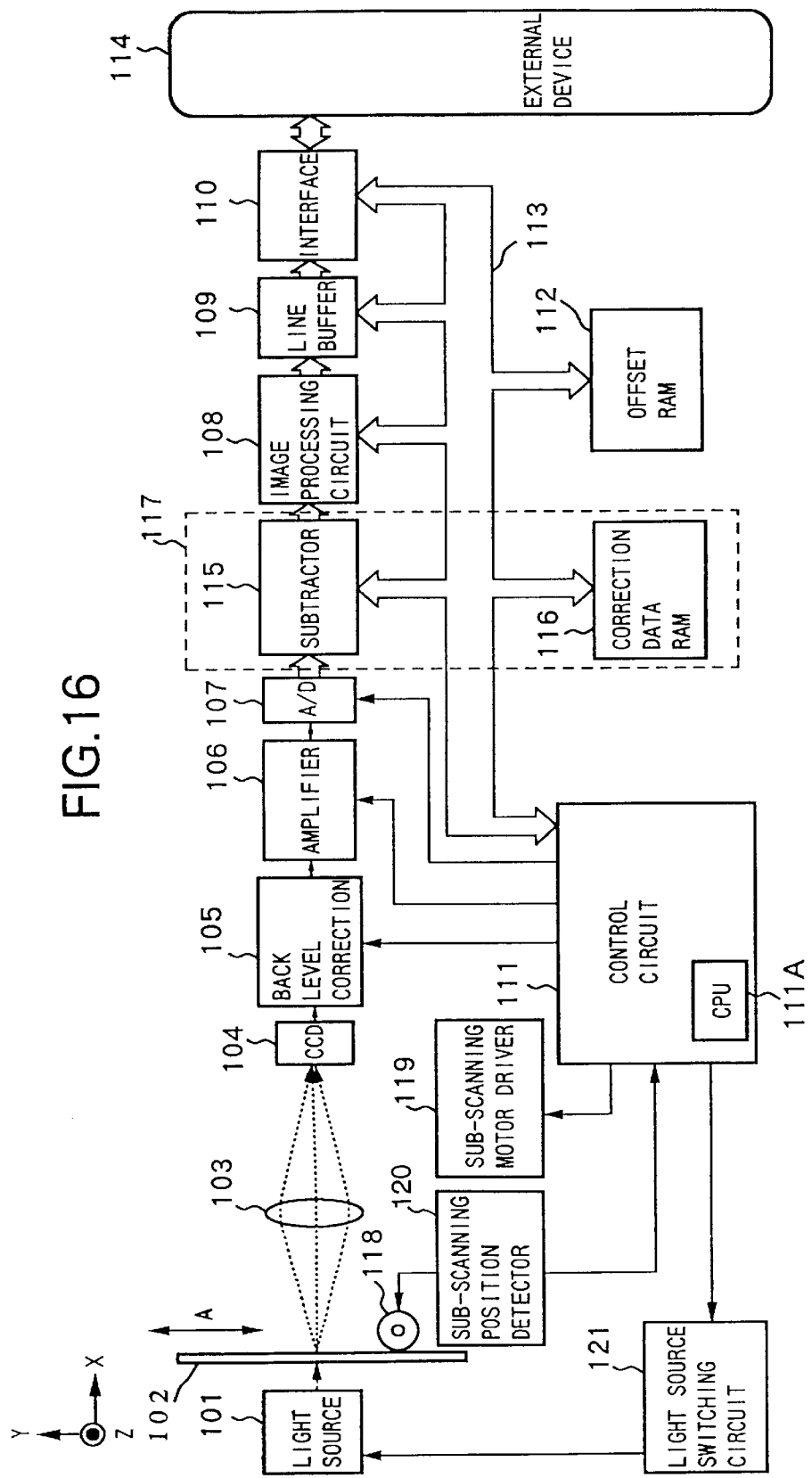
FIG. 16 is a block diagram showing the arrangement of a film scanner according to the fifth embodiment of the present invention.

FIG. 16 is a block diagram showing the arrangement of a film scanner serving as an image reading apparatus according to another embodiment in which the present invention is performed. Referring to FIG. 16, reference numeral 101 denotes a cold-cathode ray tube as an illumination light source, and reference numeral 102 denotes a film holder, for holding a film serving as a transparent original, which can be moved in the direction of arrow A on the drawing. Reference numeral 103 denotes an image-forming lens system 103, and reference numeral 104 denotes a CCD line sensor 104. Here, the CCD line sensor 104 is arranged such that the longitudinal direction is a Z-direction on the drawing. With this positioning relationship, the main-scanning direction which is the longitudinal direction of the CCD line sensor 104 is perpendicular to the sub-scanning direction which is the moving direction of the film holder 102.

Reference numeral denotes a black level correction circuit 105. The black level correction circuit 105 adjusts the black level of an analog image signal output from the CCD line sensor 104. Reference numeral 106 denotes an amplifier which can cause a control circuit 111 (to be described later) to independently change the amplification factors of RGB signals. Reference numeral 107 denotes an A/D converter which converts an analog signal amplified by the amplifier 106 into a digital signal. Reference numeral 108 denotes an image processing circuit constituted by a gate array which performs image processing (to be described later) and processing for a CCD drive pulse or the like. The image processing circuit 108 can perform various processing at a high speed.

Reference numeral 109 denotes a line buffer which temporarily stores image data and is constituted by a generalpurpose random access memory. Reference numeral 110 denotes an interface section which is used for communication with an external device such as a personal computer 114 or the like connected to the interface section. Reference numeral 11 denotes a control circuit 111 serving as a control unit for entirely controlling the film scanner. A CPU 111A arranged in the control circuit 111 performs various operations according to an instruction from the personal computer 114. Reference numeral 112 denotes a RAM serving as a working area used when image processing is performed. This RAM is called an offset RAM. In this RAM, various data for shading correction, γcorrection, color data synthesis, and the like or image data is temporarily stored.

Reference numeral 113 denotes a CPU bus 113 for connecting the control circuit 111, the image processing circuit 108, the line buffer 109, and the interface section 110 to each other. The CPU bus 113 is constituted by an address bus and a data bus. Reference numeral 115 denotes a subtractor. Here, the subtractor 115 is designed to digitally perform an arithmetic operation. reference numeral 116 denotes a noise correction RAM serving as a storage device in which noise correction data is stored. Here, the subtractor 115 and the noise correction RAM 116 constitute a correction module 117.

Reference numeral 118 denotes a sub-scanning motor for moving the film holder 102 in a sub-scanning direction. For example, a stepping motor is used as the sub-scanning motor 118. Reference numeral 119 denotes a sub-scanning motor driver for driving the sub-scanning motor 118 according to an instruction from the control circuit 111, and reference numeral 120 denotes a sub-scanning position detector for detecting the reference position of a sub-scanning operation. The sub-scanning position detector 120 detects a projection shape (not shown) of the film holder 102 by using a photo interrupter. Reference numeral 121 denotes a light source switching circuit for turning on the cold-cathode ray tube 101. The cold-cathode ray tube 101 is constituted by a so-called inverter circuit.

Figure 17A:
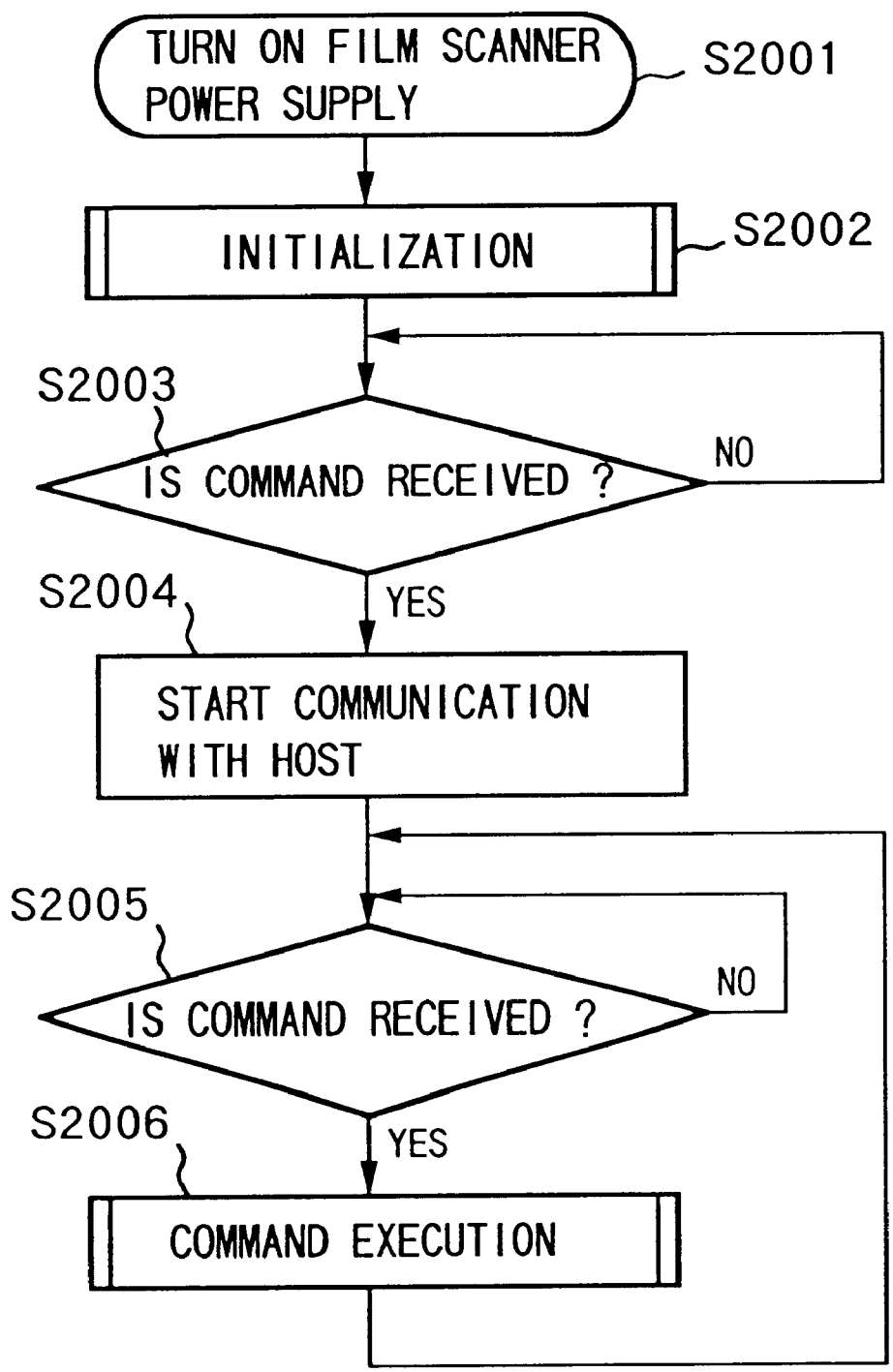
FIG. 17A is a flow chart showing a communication procedure of a film scanner according to the fifth embodiment.
Figure 17B:
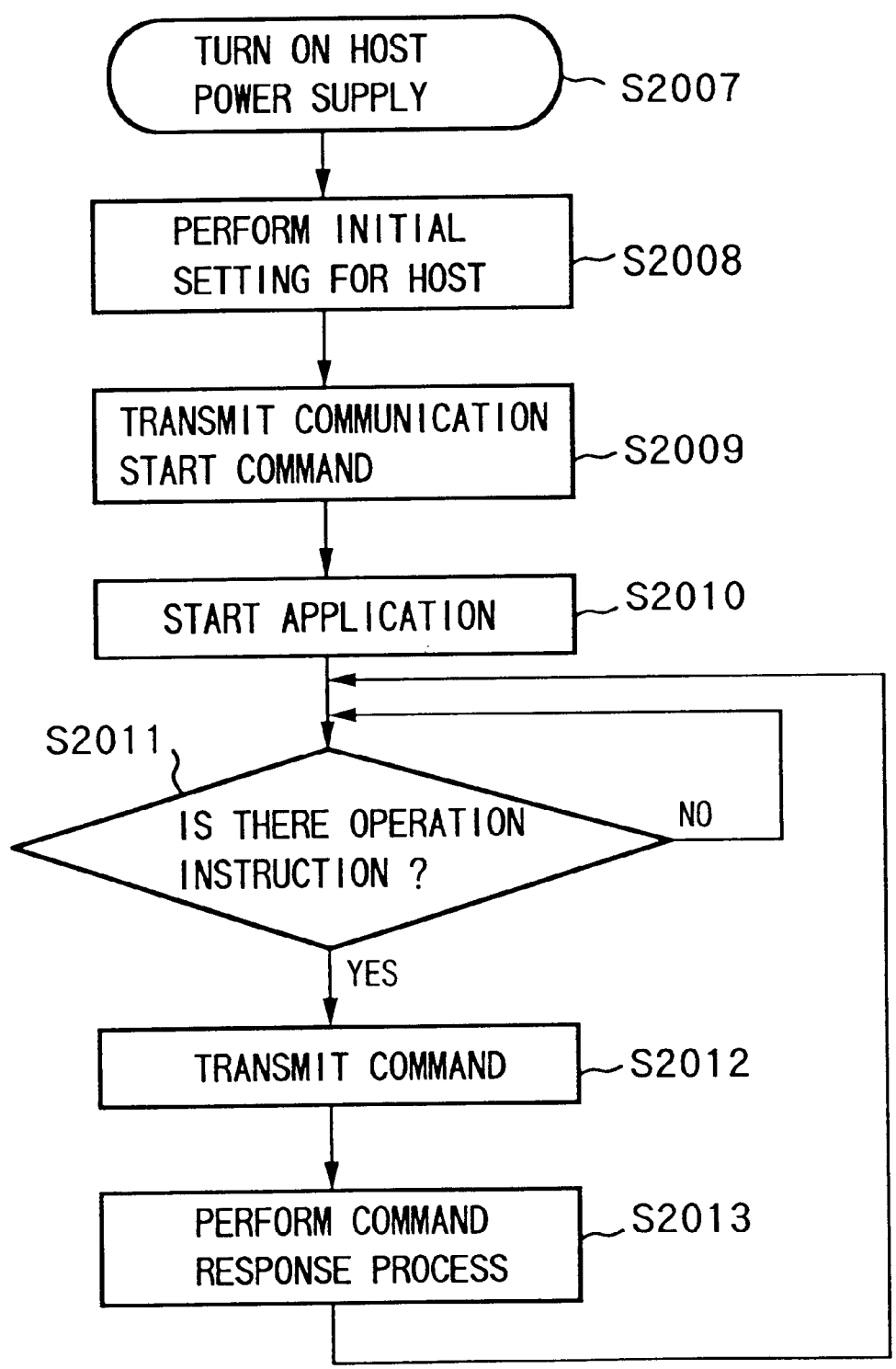
FIG. 17B is a flow chart showing a communication procedure of an external device according to the fifth embodiment.

An operation performed by the film scanner with the above arrangement will be described below. FIG. 17A is a flow chart showing a communication procedure with a film scanner, FIG. 17B is a flow chart showing a communication procedure of an external device. When the film scanner is powered on (step S2001), initialization such as initial setting of the film scanner is performed (step S2002). When the external device is powered on (step S2007), initial setting such as checking for the memory and SCSI unit of the external device is performed (step S2008).

Upon completion of the initial setting, the film scanner waits for communication from the external device. If the film scanner receives a command, the flow shifts to step S2004 (step S2003), otherwise, the process in step S2003 is repeated.

The external device transmits a communication start command to be able to communicate with the film scanner (step S2009). The external device starts application software including driver software (step S2010).

A user inputs an operation instruction for the film scanner while the application is performed. An instruction for ending the application is also included in the application. If this instruction is selected, the communication is stopped, and the application is ended (step S2011).

The driver software forms an operation instruction as a command to output the instruction to the film scanner (step S2012). The film scanner waits for a command from the external device. If the film scanner receives a command, the flow shifts to step S2006 (step S2005).

If the film scanner does not receive a command, the film scanner issues an operation sequence corresponding to the command to execute the operation. The film scanner sequentially transmits information to the external device in response to the execution (step S2006).

The external device receives an operation state from the film scanner to provide information for a user to the application. Upon completion of the command, the flow returns to step S2011 (step S2013).

Figure 18:
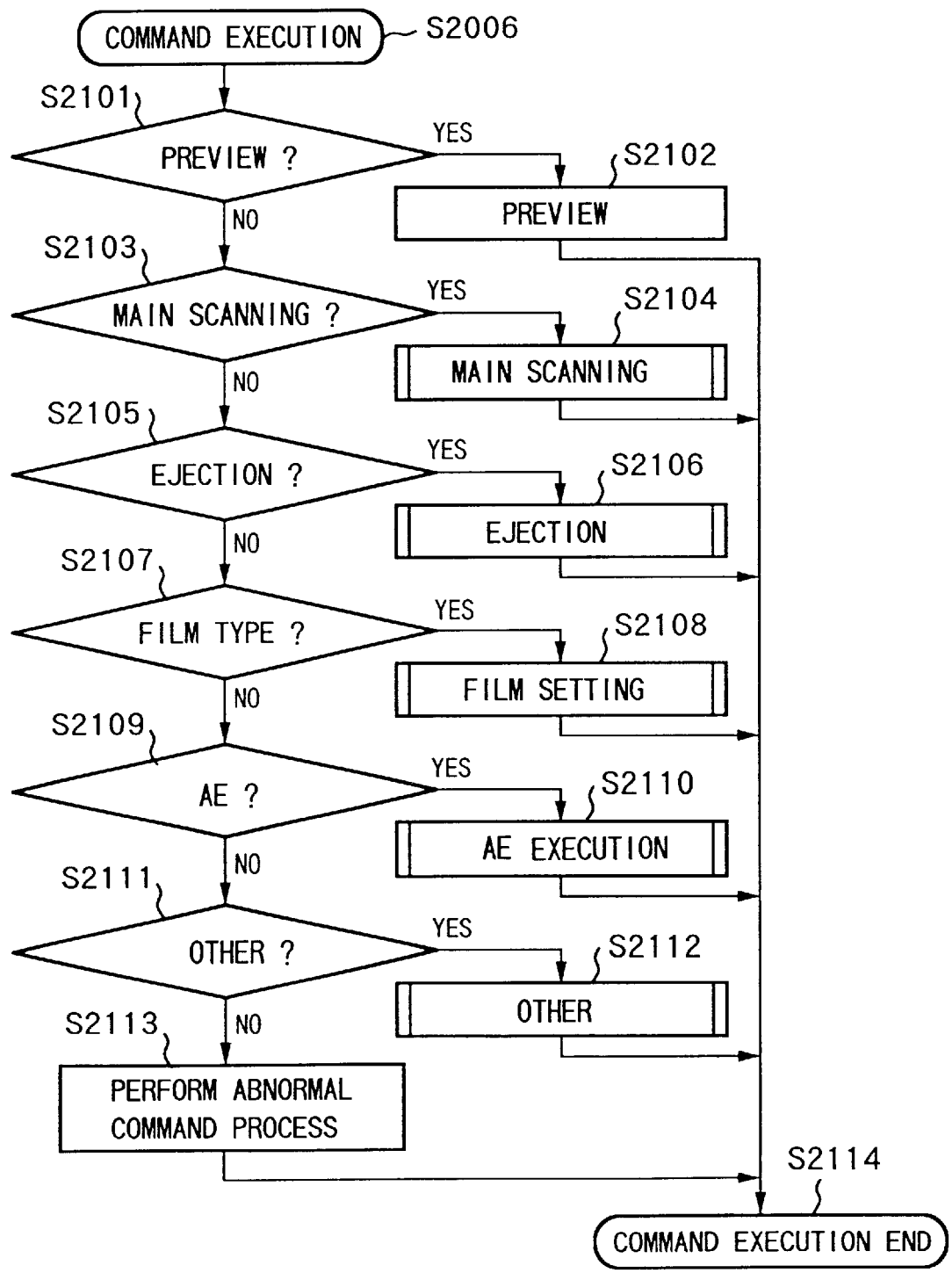
FIG. 18 is a flow chart for explaining a command execution process of the film scanner according to the fifth embodiment.

A command execution routine in the form in step S2006 is shown in FIG. 18. It is checked whether the command is a preview command (step S2101). If the command is the preview command, the flow shifts to step S2102 to execute a preview operation. If the command is not the preview command, the flow shifts to step S2103 to check whether the command is a main-scanning command. If the command is the main-scanning command, the flow shifts to step S2104 to execute a main-scanning operation.

If the command is not the main-scanning command, the flow shifts to step S2105 to check whether the command is an ejecting command. If the command is the ejecting command, the flow shifts to step S2106 to eject the film. If the command is the ejecting command, the flow shifts to step S2107 to check whether the command is a film type command. If the command is the film type command, the flow shifts to step S2108 to execute a film setting operation.

If the command is not the film type command, the flow shifts to step S2109 to check whether the command is an AE (Auto Exposure) command. If the command is the AE command, the flow shifts to step S2110 to execute exposure control. If the command is not the AE command, the flow shifts to step S2111 to check whether the command is the other command.

If the command is the other command, the flow shifts to step S2112 to execute the other command. If the command is not the other command, the flow shifts to step S2113 to process the command as an abnormal command. In step S2114, a command execution end is transmitted to the external device, and the command execution routine is ended.

Figure 19:
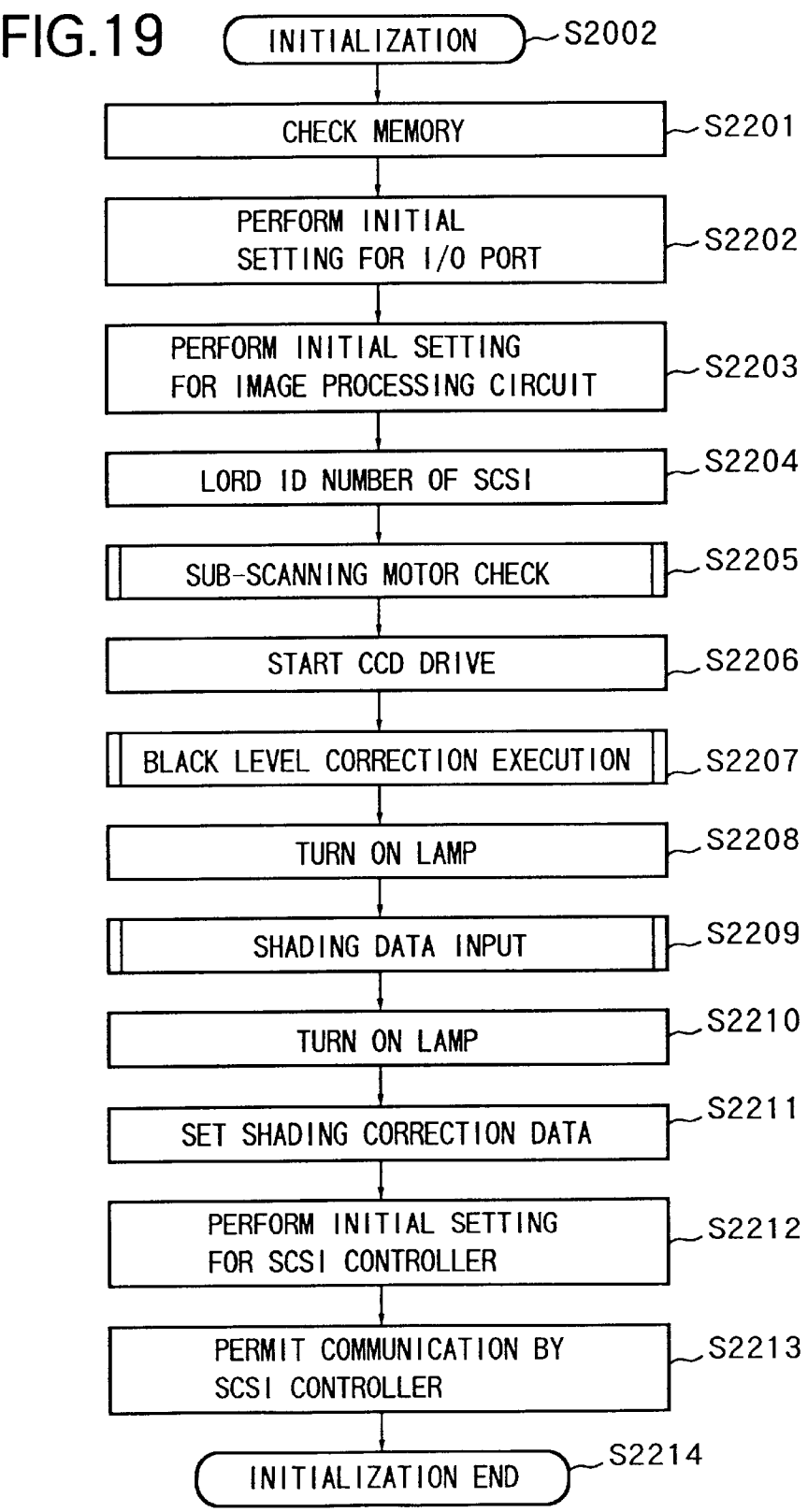
FIG. 19 is a flow chart for explaining an initializing process of the film scanner according to the fifth embodiment.

Initializing shown in step S2002 in FIG. 16 will be described below by using the flow chart in FIG. 19.

Memory checking is performed to the line buffer 109 and the RAM 112 (step S2201), initial setting for the input/output port of the control circuit 111 is performed (step S2202). Initial setting for the image processing circuit 108 is performed to make it possible to use the image processing circuit 108 (step S2203).

The control circuit 111 loads an ID number of a SCSI unit (step S2204), the sub-scanning motor 118 is driven to move the film holder 102 to a sub-scanning initial position. At the same time, the detection state of the sub-scanning position of the sub-scanning position detector 120 is also checked (step S2205).

Upon completion of the checking, the control circuit 111 permits the sub-scanning motor driver 119 to output a drive signal (step S2206). The clamp of an image signal output from the CCD 104 is adjusted, and the black level correction circuit 105 is caused to execute black level correction in which a black level is brought close to zero (step S2207).

Upon completion of the black level correction, the control circuit 111 serving as a noise measurement unit outputs a light source turn-on instruction to the light source switching circuit 121 (step S2208) to fetch predetermined shading data (step S2209), and outputs a light source turn-off instruction to the light source switching circuit 121. The fetched shading correction data is set in the offset RAM 112 (step S2211).

The control circuit 111 initially sets the interface section 110 (SCSI controller) (step S2212), permits the interface section 110 to perform communication (step S2213), and ends the initializing process (step S2214).

Figure 20:
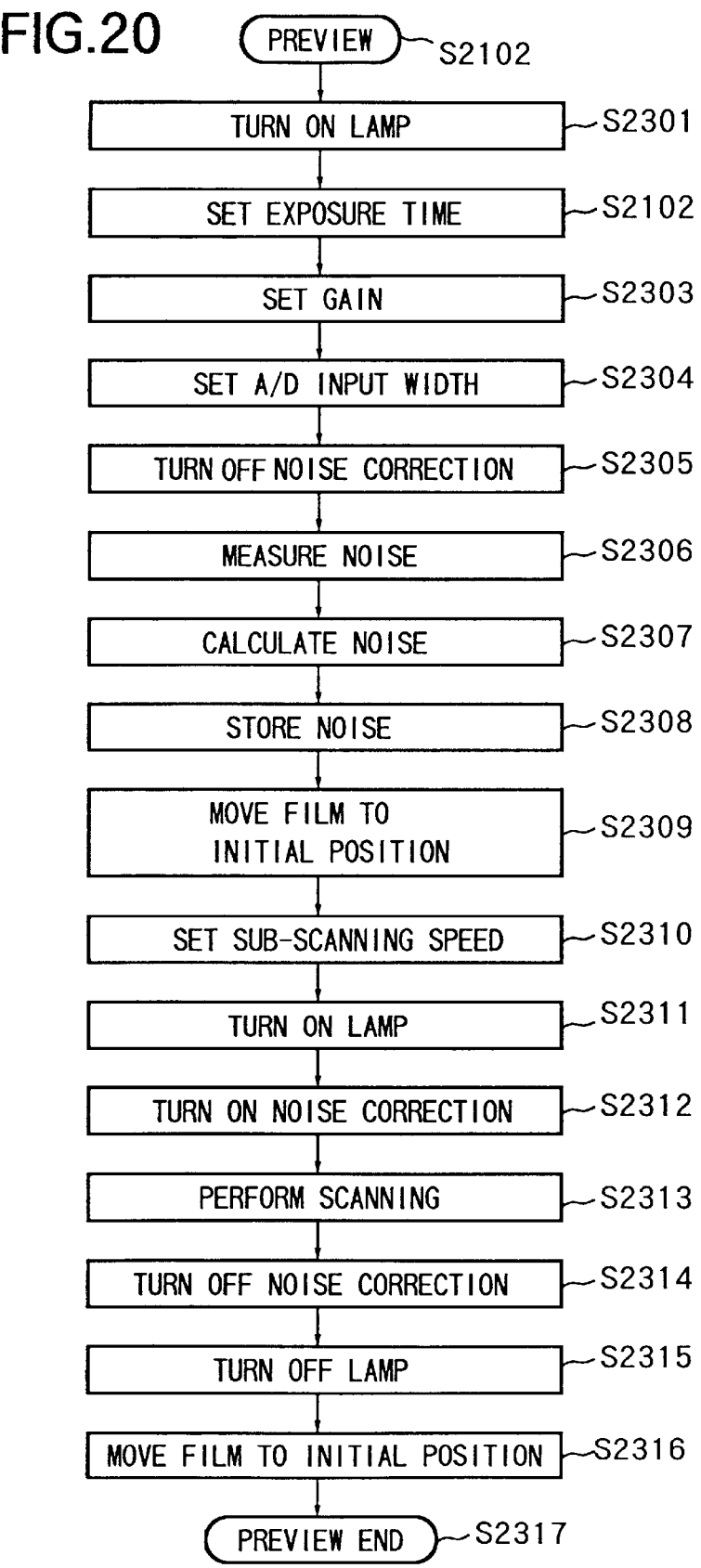
FIG. 20 is a flow chart for explaining a rough-scanning process of the film scanner according to the fifth embodiment.

Subsequently, the contents of commands will be described below. The flow chart in FIG. 20 shows the contents of the preview command in step S2102.

The control circuit 111 outputs a light source turn-off instruction to the light source switching circuit 121 (step S2301), and performs setting of an exposure time in a scanning command (step S2302), setting of an analog gain (step S2304), and setting of a dynamic range of an A/D converter (step S2304). The settings up to this are analog settings as in the main-scanning operation.

The correction module 117 is inhibited to be operated to perform noise measurement (step S2305). More specifically, control is performed not to perform a subtracting operation in the subtractor 115. Noise is measured by the above settings, and A/D-converted image information corresponding to n times is stored in the RAM 112 (step S2306). An average value is calculated on the basis of the noise data of n times stored in the RAM 112 (step S2307), and the calculated noise data is stored in a correction data RAM (step S2308).

In order to confirm a sub-scanning position before a scanning operation, the film is moved to an initial position (step S2309). The control circuit 111 sets a sub-scanning speed in a preview operation (step S2310).

For performing noise correction, the control circuit 111 changes setting to operate the correction module 117 (step S2312).

The control circuit 111 outputs an instruction to the sub-scanning motor driver 119 such that a sub-scanning speed which is equal to the set sub-scanning speed can be obtained The control circuit 111 drives the sub-scanning motor 118 to scan the film held by the film holder 102. At this time, the correction module 117 performs subtraction of noise correction data of each pixel of the line sensor. Thereafter, the image data is sequentially processed to be output to the external device 114 (step S2313).

The correction module 117 is inhibited to be operated (step S2314), and the control circuit 111 outputs a light source turn-on instruction to the light source switching circuit 121 (step S2315). The film moved by the scanning operation in step S2313 is moved to the initial position (step S2316), and the preview operation is ended (step S2317).

Figure 21:
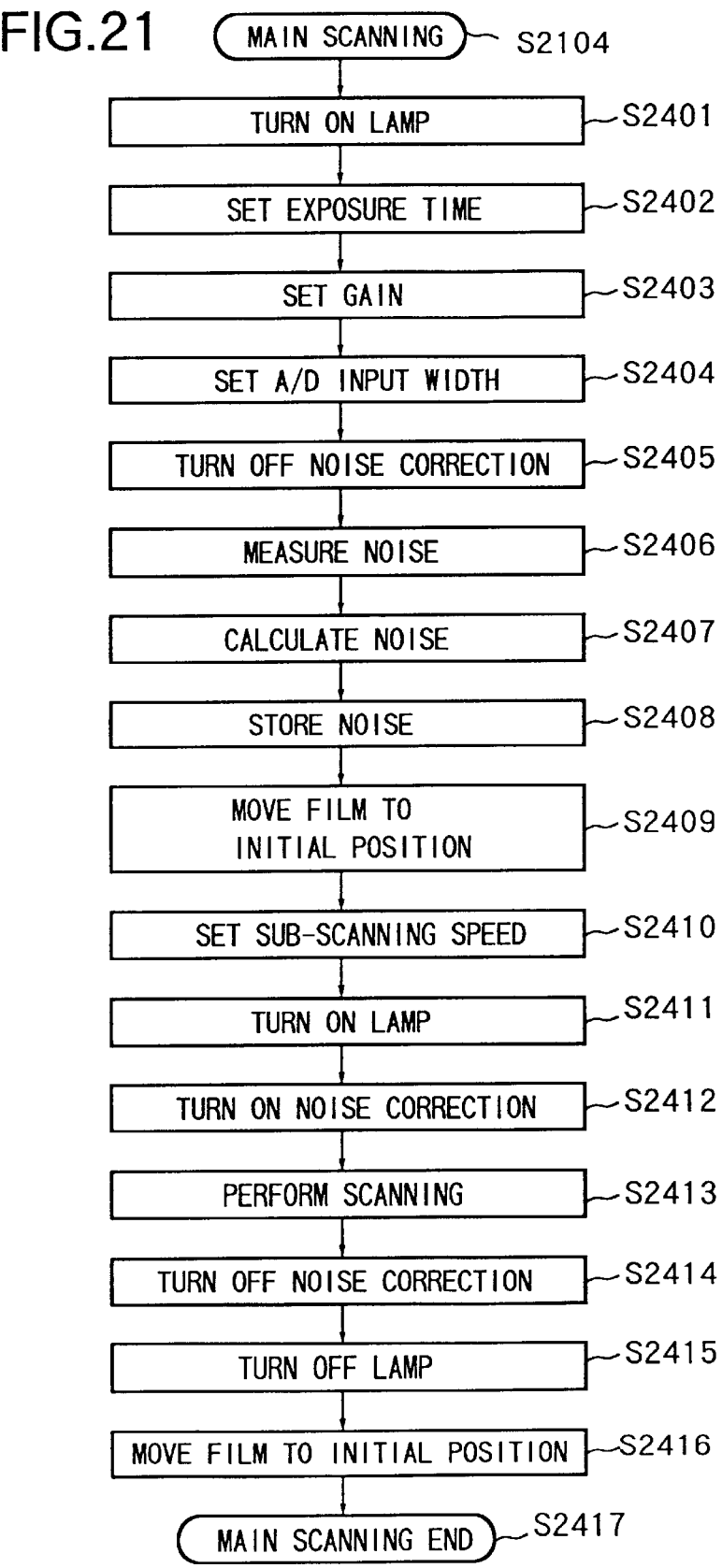
FIG. 21 is a flow chart for explaining a main-scanning process of the film scanner according to the fifth embodiment.

The contents of a fine-scanning operation (main-scanning operation) in step S2104 will be described below with reference to the flow chart in FIG. 21.

The control circuit 111 outputs a light source turn-off instruction to the light source switching circuit 121 (step S2401), and performs setting of an exposure time in a scanning command (step S2402), setting of an analog gain (step S2404), and setting of a dynamic range of an A/D converter (step S2404).

The correction module 117 is inhibited to be operated to perform noise measurement (step S2405). More specifically, control is performed not to perform a subtracting operation in the subtractor 115. Noise is measured by the above settings, and A/D-converted image information corresponding to n times is stored in the RAM 112 (step S2406). An average value is calculated on the basis of the noise data of n times stored in the RAM 112 (step S2407), and the calculated noise data is stored in a correction data RAM (step S2408).

In order to confirm a sub-scanning position before a scanning operation, the film is moved to an initial position (step S2409). The control circuit 111 sets a sub-scanning speed in a preview operation (step S2410), and outputs a light source turn-on instruction to the light source switching circuit 121 (step S2411). Setting is performed to operate the correction module 117 (step S2412).

The control circuit 111 outputs an instruction to the sub-scanning motor driver 119 such that a sub-scanning speed which is equal to the set sub-scanning speed can be obtained. The control circuit 111 drives the sub-scanning motor 118 to scan the film held by the film holder 102. At this time, the correction module 117 performs subtraction of noise correction data of each pixel of the line sensor. Thereafter, the image data is sequentially processed to be output to the external device 114 (step S2413).

The correction module 117 is inhibited to be operated (step S2414), and the control circuit 111 outputs a light source turn-on instruction to the light source switching circuit 121 (step S2415). The film moved by the scanning operation in step S2313 is moved to the initial position (step S2416), and the main-scanning operation is ended (step S2417).

Figure 22:
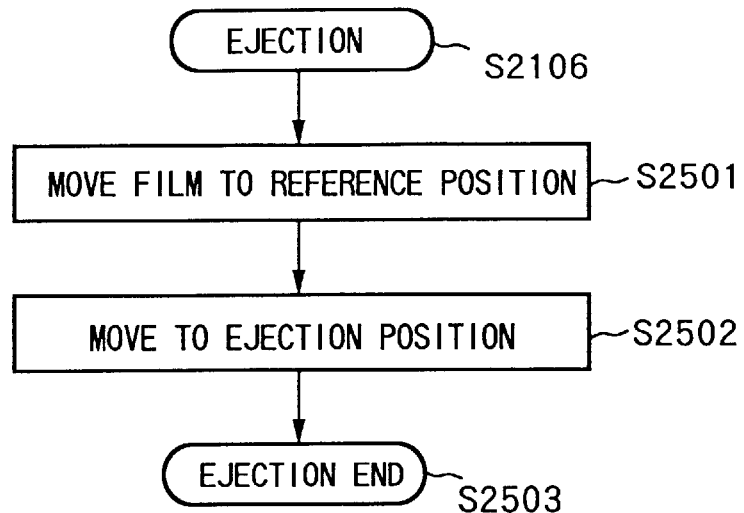
FIG. 22 is a flow chart for explaining an ejecting process of the film scanner according to the fifth embodiment.

The ejecting operation in step S2106 will be described below with reference to FIG. 22.

The control circuit 111 drives the sub-scanning motor 118 while monitoring the position detector 120 to move the film to a sub-scanning reference position (step S2501). The control circuit 111 drives the sub-scanning motor 118 by a predetermined number of pulses from the reference position in a film ejection direction to move the film to an ejection position (step S2502). The sub-scanning motor 118 is powered off at the ejection position, and the ejecting operation is ended (step S2503).

Figure 23:
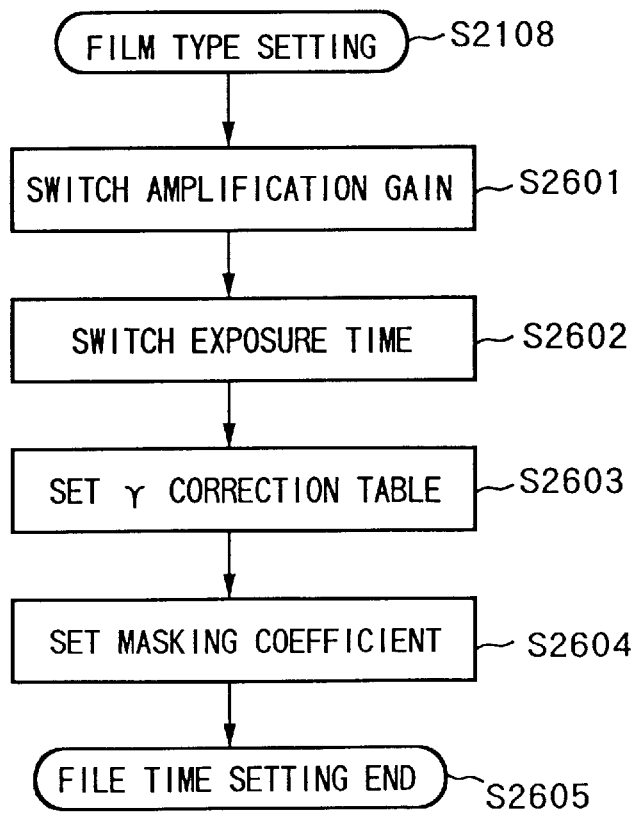
FIG. 23 is a flow chart for explaining a file type setting process of the film scanner according to the fifth embodiment.

The film type setting operation in step S2108 will be described below with reference to FIG. 23.

An amplification gain is switched to a predetermined amplification gain depending on whether the film is negative or positive and, if the film is negative, depending on a negative base density (step S2601). An exposure time is switched in accordance with a negative/positive film. If the negative film is used, the exposure time is switched depending on the density of the negative film (step S2602).

A γ correction table suitable for the film type designated in step S2601 is set in the offset RAM 112 (step S2603), and a masking coefficient suitable for the film type is set (step S2604). By the above processes, the film type setting operation is completed (step S2605).

Figure 24:
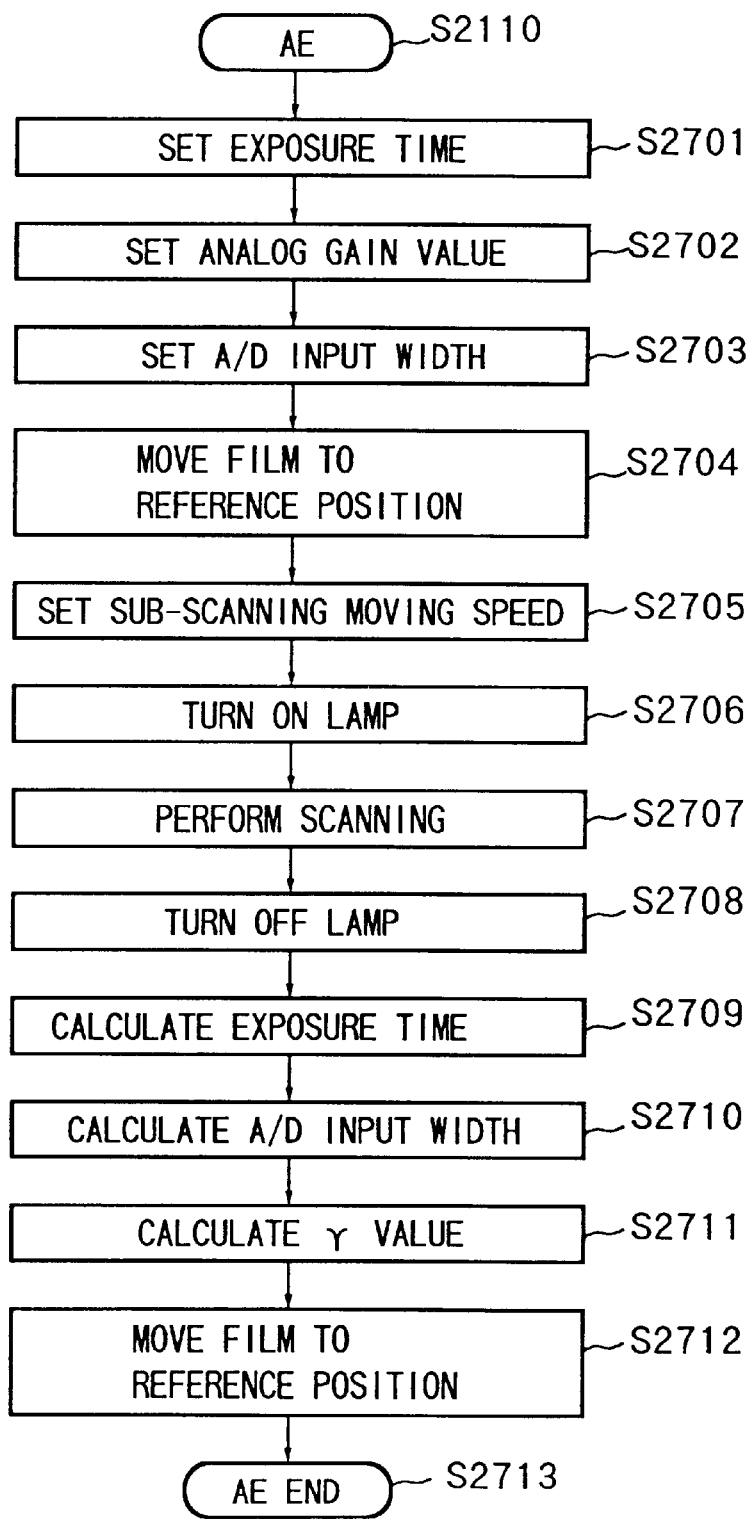
FIG. 24 is a flow chart for explaining an AE control process of the film scanner according to the fifth embodiment.

The contents of AE setting in step S2110 will be described below by using the flow chart in FIG. 24.

When the control circuit 111 receives an AE command, the control circuit 111 sets a predetermined exposure time for measuring a film image density (step S2701), and sets a predetermined analog gain value (step S2702). In addition, the control circuit 111 sets the A/D input width (dynamic range) of the A/D converter 107 to a predetermined value (step S2703). The predetermined value is stored in the control circuit 111 in advance such that the input width of the A/D converter 107 is properly set as a signal level. Electric preparation for measuring the film image density is ended.

Subsequently, the control circuit 111 observes a signal from the sub-scanning position detector 120 to control the sub-scanning motor 118 such that the film holder 102 is moved to a reference position (step S2704). A sub-scanning speed is set such that the density of the entire area of the film can be measured (step S2705). A light source turn-on instruction is output to the light source switching circuit 121 (step S2706).

Upon completion of these setting, a scanning operation is started to store the density of the film image in the offset RAM 112 as image data (step S2707) The control circuit 111 outputs a light source turn-off instruction to the light source switching circuit 121 (step S2708) and forms histograms of respective colors on the basis of the image data stored in the offset RAM 112, so that an exposure time is calculated to obtain a more wide dynamic range (step S2709).

The A/D input width (dynamic range) of the A/D converter 107 is calculated on the calculated exposure time (step S2710), and a γcorrection value in image process is calculated on the basis of the calculated exposure time and the calculated A/D input value. With these calculations, new loading conditions for a film to be scanned are set (step S2711).

The control circuit 111 controls the sub-scanning motor 118 while monitoring the position detector 120 to move the film holder 102 to a reference position (step S2712), and the operation of the AE command is ended (step S2713).

Depending on the measured film density, the exposure of a read image is controlled by one of the methods described in the first to fourth embodiments.

As described above, according to the fifth embodiment, when an amount of noise of each pixel is measured immediately before a scanning operation, and the amount of noise is subtracted in the scanning operation, the scanned image can be free from stripes in a sub-scanning direction. According to this embodiment, since image data obtained by a scanning operation is not subjected to image processing such as smoothing or averaging, a high-quality image can be obtained.

As described above, according to the first to fifth embodiment, an image reading operation with appropriate exposure can be performed without arranging an aperture unit or an aperture controller. Therefore, a high-quality image and a reduction in size of the apparatus structure can be compatible with each other. Further, image reading time can also be considerably shortened.

Next, image reading apparatuses (film scanners) which employ cold-cathode ray tubes as light sources for illuminating film images will be described-below with reference to the sixth to eighth embodiments. Operation control and light source luminance control of the film carriages described in the first to fifth embodiments can also be applied to the film scanners described later.

<Sixth Embodiment>

Figure 25:
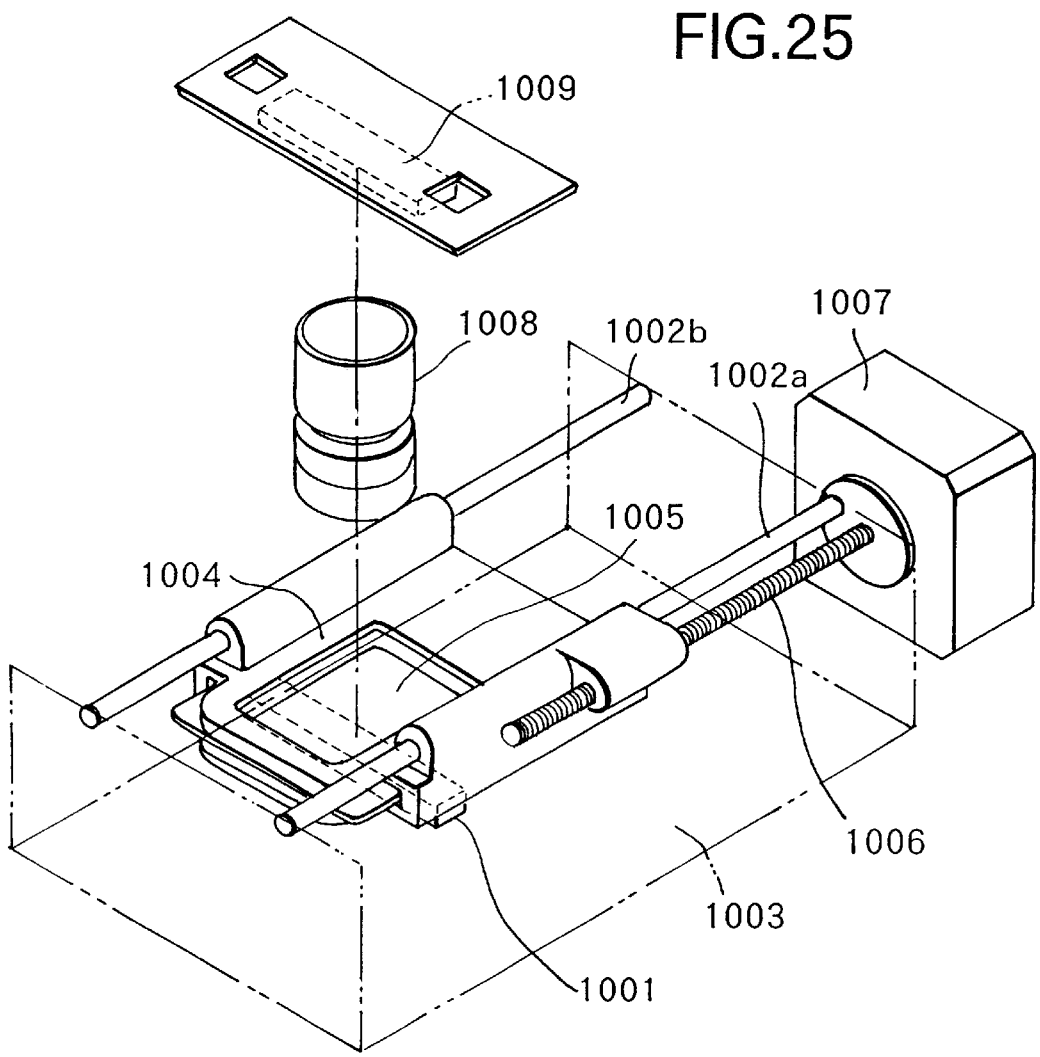
FIG. 25 is a perspective view showing the sixth embodiment of the present invention.

FIG. 25 is a perspective view showing the sixth embodiment of the present invention. In FIG. 25, reference numeral 1001 denotes a cold-cathode ray tube light source serving as an illumination unit; 1002a and 1002b, guide shafts serving as guide unit serving as guide means of a film carriage 1004; 1003, a main body serving as a housing to which various device parts are fixed; 1004, a film carriage serving as a film original holding member in which a film original is slidably inserted to hold it; 1005, a film original; 1006, a feeding screw serving a moving device for the film carriage 1004; 1007, a stepping motor for rotating the feeding screw 1006 to move the film carriage 1004; 1008, a lens serving an image-forming device for focusing light transmitted through the film original 1005 by illumination light from the cold-cathode ray tube light source 1001; and 1009, a line CCD serving as a linear image sensor for photoelectrically converting a light flux from the lens 1008.

The cold-cathode ray tube light source 1001 is basically luminescence (cold light) which emits light without generating high heat. In general, a fluorescent material emits light. One example of the light source corresponds to an EL (Electro-Luminescence) element being capable of performing planar light source emission or an FED (Field Emission Display) serving as an electron-emitting element for outputting an electron beam to irradiate it on a fluorescent material. The cold-cathode ray tube light source 1001 can emit light with an emission wavelength in a visible ray region, and has the following merits. That is, a high emission speed and a compact shape can be obtained.

In the film original reading apparatus, light transmitted through the film original 1005 illuminated by the cold-cathode ray tube light source 1001 is focused on the line CCD 1009 by the lens 1008. The film carriage 1004 which holds the film original 1005 is arranged such that the film carriage 1004 can move along the guide shafts 1002a and 1002b according to the rotation of the feeding screw 1006. The moving direction of the film carriage 1004 is set to be almost perpendicular to the pixel alignment direction of the line CCD 1009. The film carriage 1004 is screw-tapped. The film carriage 1004 is designed such that the film carriage 1004 moves forward/backward in the moving direction by 9.4 μm every step when the feeding screw 1006 is rotated by the motor 7.

In a reading operation of the film original, the cold-cathode ray tube light source 1001, the lens 1008, and the line CCD 1009 are fixed to have a predetermined positional relationship, and exposure is performed by the line CCD 1009 for a predetermined period of time. Thereafter the feeding screw 1006 is rotated by one step to move the film carriage 1004 to the next reading position. These operations are sequentially repeated to read the entire image of the film original 1005.

Figure 26:
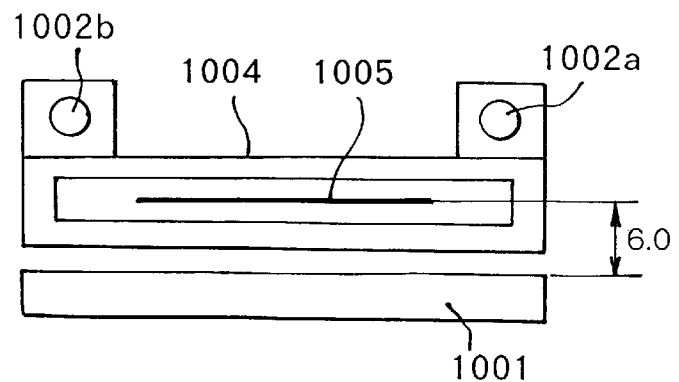
FIG. 26 is a sectional view showing the sixth embodiment of the present invention.

In this embodiment, as shown in FIG. 26, the sectional structures of the film carriage 1004, the guide shafts 1002a and 1002b, and the film original 1005 are described with respect to the cold-cathode ray tube light source 1001. Assume that distance from the film original 1005 which is fixed to the film carriage 1004 and moves to the light-emitting surface of the cold-cathode ray tube light source 1001 was set to 6 mm, and that the lens 1008 had effective F No. 5.6. An exposure time required to obtain a proper signal level in the line CCD 1009 was 1.4 msec per line. At this time, a time required to read the entire image of the film original 1005 is 6.25 sec on the assumption that one image has 446 lines. For this reason, a reading operation having a speed higher than that of a known film reading apparatus could be performed.

<Seventh Embodiment>

Figure 27:
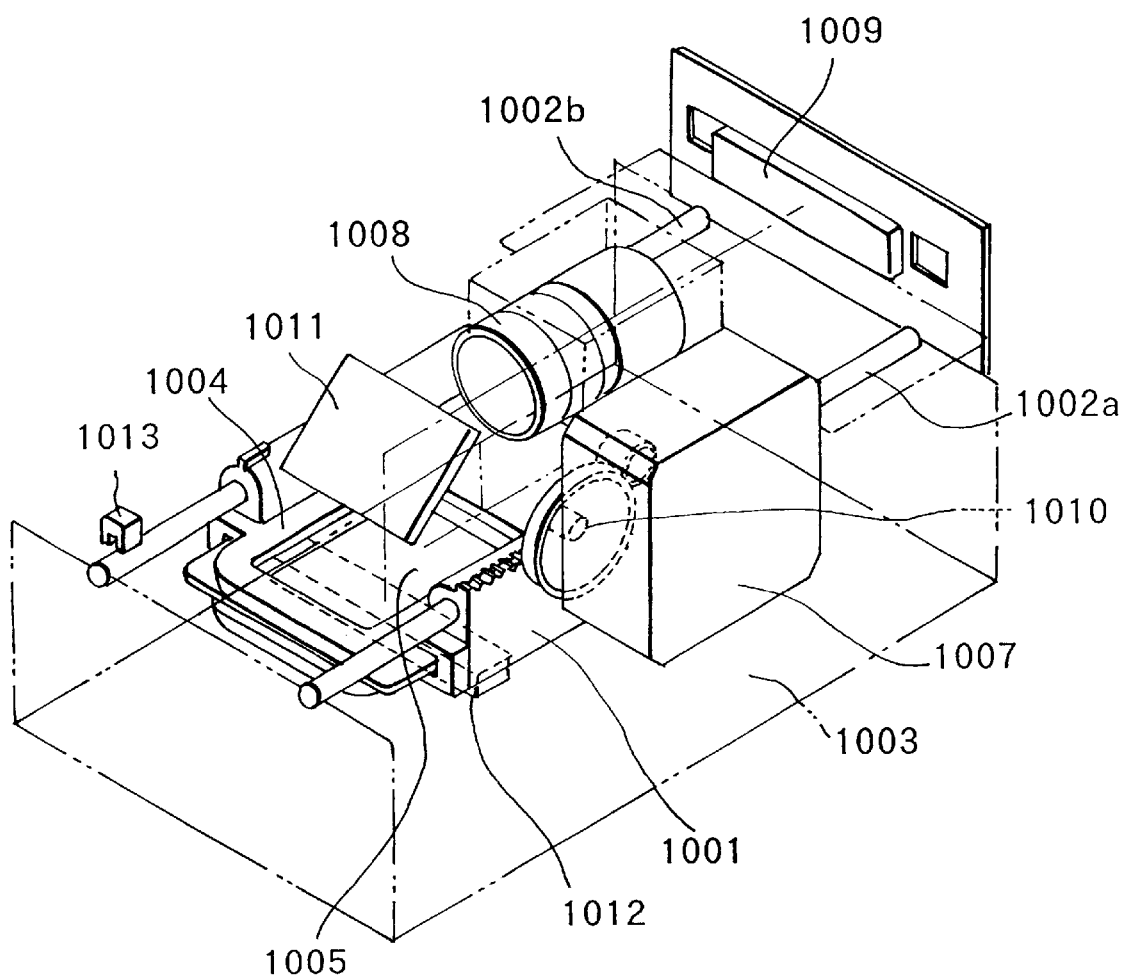
FIG. 27 is a perspective view showing the seventh embodiment of the present invention.

FIG. 27 shows the seventh embodiment of the present invention. In this embodiment, FIG. 27 is a perspective view showing the seventh embodiment of the present invention. The same reference numerals as in FIG. 25 denote the same parts in FIG. 27, and a description thereof will be omitted. In FIG. 27, reference numeral 1001 denotes a cold-cathode ray tube light source serving as an illumination device; 1002a and 1002b, guide shafts serving as guide unit of a film carriage 1004; 1003, a main body serving as a housing; 1004, a film carriage serving as a film original holding member; 1012, a rack gear unit arranged on the film carriage 1004; 1005, a film original; 1010, a pinion gear serving as a moving device for the film carriage 1004; 1007, a stepping motor for rotating the pinion gear 1010; 1013, a reset switch serving as a unit for detecting a reading start position of the film carriage 1004; 1008, a lens serving an image-forming device; 1011, a return mirror for bending the optical path of the lens 1008 at an almost right angle; and 1009, a line CCD serving as a linear image sensor.

The operation of this embodiment will be described below. As in the sixth embodiment, when the stepping motor 1007 is rotated, the pinion gear 1010 is rotated to move the film carriage 1004 through the rack gear unit 1012. In the start of a reading operation, the film carriage 1004 is moved until an output from the reset switch 1013 is detected, and the position of the film carriage 1004 is corrected.

In this embodiment, the moving direction of the film carriage 1004 and the optical axis of the lens 1008 were almost parallel to each other by the return mirror 1011. For this reason, the lens 1008 could be arranged in the horizontal direction, and the total height of the apparatus could be made small, i.e., 70 mm. Since the position at the start of the reading operation is detected by the reset switch 1013, a reading operation could be performed at a correct position.

<Eighth Embodiment>

Figure 28:
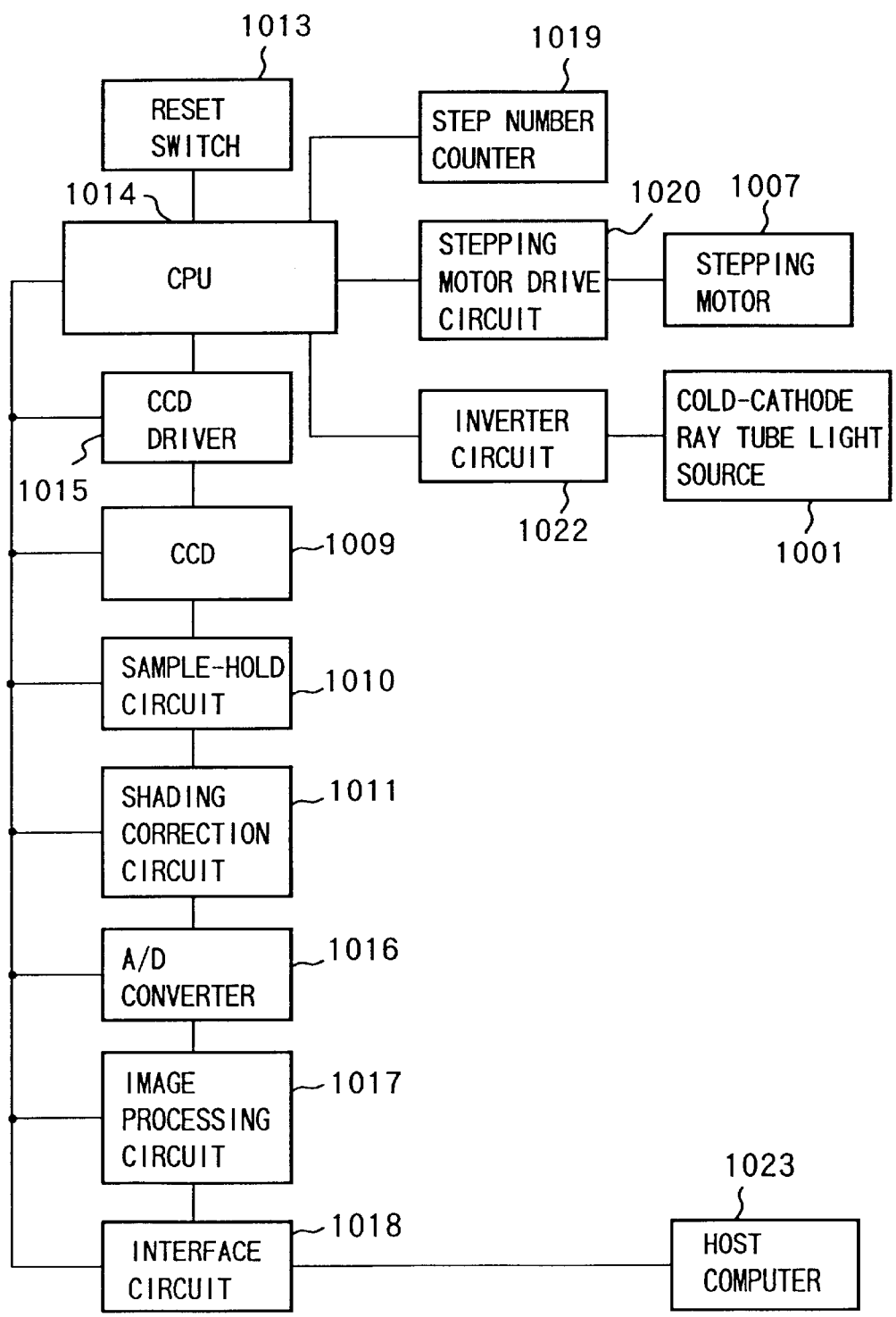
FIG. 28 is a circuit block diagram showing the eighth embodiment of the present invention.

FIG. 28 is a block diagram showing a control circuit of a film original reading apparatus according to the present invention. In this embodiment, the reading apparatus described in the seventh embodiment is driven by the control circuit. In FIG. 28, reference numeral 1014 denotes a CPU for controlling the reading apparatus as a whole; 1013, a reset switch ON/OFF-operated by movement of the film carriage 1004 for arranging a film 1005 at an initial position; 1015, a CCD driver for driving a line CCD 1009 according to an instruction from the CPU 1014; 1010, a sample-hold circuit for sample-holding an analog image signal output from the CCD 1009; 1011, a shading correction circuit for performing shading correction to an analog image signal output from the sample-hold circuit 1010; 1016, an A/D converter for converting an analog image signal output from the shading correction circuit 1011 into digital image data; 1017, an image processing circuit for performing image processing such as γcorrection or color correction to the digital image data; 1018, an interface circuit for transmitting the image data subjected to the image processing to a host computer 1023 or transmitting an instruction from the host computer 1023 to the CPU 1014; 1019, a step number counter for counting the step number of a stepping motor 1007 in response to the instruction from the CPU 1014; 1020, a stepping motor drive circuit for rotating the stepping motor 1007 every step under the control of the CPU 1014; 1022, an inverter circuit for turning on/off a cold-cathode ray tube light source 1001 with good electric-power/time efficiency according to the instruction from the CPU 1014; and 1023, a host computer for controlling the film original reading apparatus.

FIG. 29 is a flow chart of a reading operation according to this embodiment. The power supply of the film original reading apparatus is turned on in step S1001. When the CPU 1014 receives an instruction for starting a reading operation from the personal computer serving as the host computer 1023 (S1002 and S1003), the stepping motor 1007 is rotated by the stepping motor drive circuit 1020, and this rotation moves the film carriage 1004 to a reset position (S1004).

When the end of the movement is detected by the reset switch 1013, the CPU 1014 stops the movement of the film carriage 1004, resets the numeral value of the step number counter 1019 is reset (S1005), turns on the cold-cathode ray tube light source 1001 through the inverter circuit 1022 (S1006), causes the CCD driver 1015 to generate a drive pulse to the line CCD 1009 (S1007), and drives the line CCD 1009. At the reset position set by the reset switch 1013, the film carriage 1004 is located at a position which is completely offset the optical axis of the lens 1008. For this reason, shading correction data is collected on the basis of an output value of each pixel of the line CCD 1009 (S1008).

Thereafter, the CPU 1014 moves the film carriage 1004 to the reading start position (S1009), and causes the line CCD 1009 to collect an image of one line of the film original 1005 (S1010). An output from the line CCD 1009 is converted in to digital data by the A/D converter circuit (S1011). The resultant digital data whose sensitivity difference and light amount ununiformity in each pixel are corrected by the image processing circuit 1017 on the basis of shading correction data collected before the reading operation is started (S1012), and the image data subjected to correction is transferred to the host computer 1023 through the interface (S1013).

Upon completion of the transferring, the CPU 1014 checks whether the reading operation is completed (S1014). If NO in step S1014, the stepping motor 1007 is driven by the stepping motor drive circuit 1020 to move the film position, 1 is added to the numeral value of the step number counter 1019 (S1015), and the flow returns to step S1010. As described above, an operation of reading the image of the film original while moving the film carriage 1004 every line is sequentially repeated. When the numeral value reaches a predetermined numeral value, and the film original 1005 reaches the reading end position, the reading operation is ended, image data related to the film original is transferred to the host computer 1023. When the end of the reading operation is detected by the step number counter 1019, power supply to the inverter circuit 1022 is ended, the cold-cathode ray tube light source 1001 is turned off (S1016), the film carriage 1004 is moved to the reading start position, and the code of the end of reading is transferred to the host computer 1023 (S1017).

In this embodiment, since the CPU 1014 controls operations performed in a period from the start of reading to the end of reading, the ON time of the cold-cathode ray tube light source 1001 can be set to a necessary minimum. For this reason, power consumption can be reduced in a state wherein the cold-cathode ray tube light source 1001 need not be turned on. Since a light source turn-on time per reading operation can be shortened, the number of times of reading within a durable time can be increased.

The above embodiment exemplifies the following case. That is, an illumination device, a lens, and a line CCD are arranged to have a predetermined positional relationship, and a film carriage to which a film is fixed is moved by a stepping motor. When these members are relatively moved, one film image can be read. For this reason, any one of the members may be moved.

A case wherein a line sensor is used to read an image has been exemplified. A planar light source in which a cold-cathode ray tube light source illuminates the entire area of one film, and the diameter of the lens is made large, so that the line sensor is constituted as an area sensor which can directly read one film. In this case, one film image can be directly read, and the cold-cathode ray tube light source which does not radiate heat rarely radiate heat. Distortion to the film surface does not occur. In this case, with the above shading correction or the image processing circuit, various image processing depending on each of film image can also be performed. In particular, the light amount accumulation time of the area sensor may change depending on films, and image processing can be properly changed for each film depending on the transparent image. For example, when a dark film image is used, an accumulation time is elongated; and when the average of an amount of transmission light is large, the accumulation time can also be shortened.

As has been described above, according to the sixth to eighth embodiments, since the light source using a cold-cathode ray tube generates a smaller amount of heat than that of a known illumination device such as a fluorescent lamp, adverse affection to a film caused by an increase in temperature can be suppressed. In addition, since the illumination device is arranged near the film, a reading speed can be made high by increasing illuminance of the light source on the film original.

Since a time between when the light source is turned on when a light amount is stable can be made shorter than that in a known illumination device, the light source can be turned off except in a reading operation in which the light source must be set in an OFF state. Power saving of the reading apparatus can be performed, and the lifetime of the light source when viewed from the number of times of reading can be elongated.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus comprising:
   a reading device for reading an image;
   a density detection unit for detecting a density level of the image, and determining in which one of three pre-determined density level ranges the detected density level is included;
   first and second exposure adjustment units for adjusting exposure when said reading device reads the image; and
   a control unit for causing said first exposure adjustment unit to adjust the exposure when the detected density level is included in a second density level range, and causing said second exposure adjustment unit to adjust the exposure when the detected density level is included in either a first or a third density level range, said first and third density level ranges sandwiching the second density level range therebetween,
   wherein the pre-determined three density level ranges are of density levels capable of being detected by said density detection unit, and
   the first density level range is for an image having lower density level than a predetermined first density value, the second density level range is for an image having higher density level than the predetermined first density value and having lower density level than a predetermined second density value, and the third density level range is for an image having higher density level than the predetermined second density value.

2. An image reading apparatus according to claim 1, wherein said first exposure adjustment unit is a moving device for performing relative movement between the image and said reading device, and
   said second exposure adjustment unit is a light amount adjustment unit for adjusting an amount of light of a light source which irradiates light on the image.

3. An image reading apparatus according to claim 2, wherein said moving device performs the relative movement between the image and said reading device by using a motor.

4. An image reading apparatus according claim 3, wherein said motor is a stepping motor, and said moving device controls a pulse for driving said stepping motor to change the relative moving speed between the image and said reading device.

5. An image reading apparatus according to claim 1, wherein said density detection unit detects the density level of the image on the basis of an amount of light from the image.

6. An image reading apparatus according to claim 5, wherein the image is an image recorded on a film, and said density detection unit detects the density level of the image on the basis of the amount of light which is part of light irradiated on the film by a lighting device and transmitted through the film.

7. An image reading method, comprising:
   an image reading step of reading an image by a reading device;
   a density detection step of detecting a density level of the image by a density detection unit, and determining in which one of three predetermined density level ranges the detected density level is included; and
   an exposure adjusting step of adjusting exposure by first and second exposure adjustment units when said reading device reads the image,
   wherein in said exposure adjusting step, the exposure is adjusted by said first exposure adjustment unit when the detected density level is included in a second density level range, and the exposure is adjusted by said second exposure adjustment unit when the detected density level is included in either a first or a third density level range, said first and said third density level ranges sandwiching said second density level range therebetween, and
   the first density level range is for an image having lower density level than a predetermined first density value, the second density level range is for an image having higher density level than the predetermined first density value and having lower density level than a predetermined second density value, and the third density level range is for an image having higher density level than the predetermined second density value.

8. An image reading method according to claim 7, wherein a moving device performing relative movement between the image and said reading device is used as said first exposure adjustment unit, and
   a light amount adjustment unit adjusting an amount of light of a light source which irradiates light on the image is used as said second exposure adjustment unit.

9. An image reading apparatus comprising:
   a reading device for reading an image;
   a density detection unit for detecting a density level of the image, and determining in which one of three pre-determined density level ranges the detected density level is included;
   first and second exposure adjustment units for adjusting exposure when said reading device reads the image; and
   a control unit for causing said first exposure adjustment unit to adjust the exposure when the detected density level is included in a second density level range, and causing said second exposure adjustment unit to adjust the exposure when the detected density level is included in either a first or a third density level range, said first and third density level ranges sandwiching the second density level range therebetween,
   said control unit further causing said first exposure adjustment unit to remain constant when the detected density level is included in said first or third density level range, and causing said second exposure adjustment unit to remain constant when said detected density level is included in said second density level range,
   wherein the pre-determined three density level ranges are of density levels capable of being detected by said density detection unit, and
   the first density level range is for an image having lower density level than a predetermined first density value, the second density level range is for an image having higher density level than the predetermined first density value and having lower density level than a predetermined second density value, and the third density level range is for an image having higher density level than the predetermined second density value.

10. An image reading apparatus according to claim 9, wherein said first exposure adjustment unit is a moving device for performing relative movement between the image and said reading device, and said second exposure adjustment unit is a light amount adjustment unit for adjusting an amount of light of a light source which irradiates light on the image.

11. An image reading apparatus according to claim 10, wherein said moving device performs the relative movement between the image and said reading device by using a motor.

12. An image reading apparatus according to claim 11, wherein said motor is a stepping motor, and said moving device controls a pulse for driving said stepping motor to change the relative moving speed between the image and said reading device.

13. An image reading apparatus according to claim 9, wherein said density detection unit detects the density level of the image on the basis of an amount of light from the image.

14. An image reading apparatus according to claim 13, wherein the image is an image recorded on a film, and said density detection unit detects the density level of the image on the basis of the amount of light which is part of light irradiated on the film by a lighting device and transmitted through the film.

15. An image reading method, comprising:

an image reading step of reading an image by a reading device;

a density detection step of detecting a density level of the image by a density detection unit, and determining in which one of three predetermined density level ranges the detected density level is included; and an exposure adjusting step of adjusting exposure by first and second exposure adjustment units when said reading device reads the image, wherein in said exposure adjusting step, the exposure is adjusted by said first exposure adjustment unit when the detected density level is included in a second density level range, and the exposure is adjusted by said second exposure adjustment unit when the detected density level is included in either a first or a third density level range, said first and said third density level ranges sandwiching said second density level range therebetween, wherein said first exposure adjustment unit remains constant when the detected density level is included in said first or third density level range, and said second exposure adjustment unit remains constant when said detected density level is included in said second density level range, and the first density level range is for an image having lower density level than a predetermined first density value, the second density level range is for an image having higher density level than the predetermined first density value and having lower density level than a predetermined second density value, and the third density level range is for an image having higher density level than the predetermined second density value.

16. An image reading method according to claim 15, wherein a moving device performing relative movement between the image and said reading device is used as said first exposure adjustment unit, and a light amount adjustment unit adjusting an amount of light of a light source which irradiates light on the image is used as said second exposure adjustment unit.

* * * * *

UNITED STATES PATENT AND TRADEMARK OFFICE
CERTIFICATE OF CORRECTION

PATENT NO.   : 6,252,645 B1
DATED        : June 26, 2001
INVENTOR(S)  : Nagano et al.

It is certified that error appears in the above-identified patent and that said Letters Patent is hereby corrected as shown below:

Column 13,
Line 5, delete "11" and insert therefor -- 111 --
Line 20, delete "reference" and insert therefor -- Reference --

Column 15,
Line 35, insert "." after: obtained

Column 17,
Line 1, insert "." after: (step S2707)
Line 39, delete "described-below" and insert therefor -- described below --

Signed and Sealed this

Twelfth Day of March, 2002

Attest:

JAMES E. ROGAN
*Director of the United States Patent and Trademark Office*

*Attesting Officer*